US009064251B2

(12) United States Patent
Lal et al.

(10) Patent No.: US 9,064,251 B2
(45) Date of Patent: Jun. 23, 2015

(54) PLUG-IN BASED CHIP CARD PAYMENTS

(75) Inventors: Himanshu Lal, Mercer Island, WA (US); Ruben Delgado, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 428 days.

(21) Appl. No.: 13/297,283

(22) Filed: Nov. 16, 2011

(65) Prior Publication Data
US 2013/0124348 A1 May 16, 2013

(51) Int. Cl.
G06Q 20/00 (2012.01)
G06Q 40/00 (2012.01)
G07F 19/00 (2006.01)
G07B 17/00 (2006.01)
G06K 5/00 (2006.01)
G06K 15/00 (2006.01)
G06Q 20/20 (2012.01)
G07F 7/08 (2006.01)

(52) U.S. Cl.
CPC .............. *G06Q 20/20* (2013.01); *G06Q 20/204* (2013.01); *G07F 7/0873* (2013.01); *G07F 7/0886* (2013.01); *G06Q 20/202* (2013.01)

(58) Field of Classification Search
CPC ... G06Q 20/20; G06Q 20/204; G06Q 20/202; G06Q 20/105; G06Q 20/102; G06Q 40/00; G07F 19/20; G07F 7/1008
USPC ........... 705/16, 17, 21, 40; 235/375, 379–383
See application file for complete search history.

(56) References Cited

U.S. PATENT DOCUMENTS

| 7,451,926 | B2* | 11/2008 | Bykov et al. ................. 235/383 |
| 7,630,936 | B2* | 12/2009 | Kumar et al. ................. 705/39 |
| 7,904,339 | B2  | 3/2011  | Shah et al. |
| 7,975,916 | B2* | 7/2011  | Bykov et al. ................. 235/383 |
| 8,225,333 | B2* | 7/2012  | Ng et al. ..................... 719/321 |
| 8,260,668 | B2* | 9/2012  | Shah et al. ................... 705/16 |
| 8,308,063 | B2* | 11/2012 | Bykov et al. ................. 235/383 |
| 8,311,947 | B2* | 11/2012 | Sunkammurali et al. ....... 705/52 |
| 2007/0029376 | A1* | 2/2007 | Stoutenburg et al. ......... 235/379 |
| 2007/0094085 | A1* | 4/2007 | Redmond et al. ............. 705/21 |
| 2007/0276763 | A1* | 11/2007 | Kleinman et al. ............. 705/64 |
| 2007/0282741 | A1* | 12/2007 | Kumar et al. ................. 705/40 |
| 2008/0109372 | A1* | 5/2008 | Bykov et al. ................. 705/71 |

(Continued)

OTHER PUBLICATIONS

Balfe, et al., "e-EMV: Emulating EMV for Internet payments using Trusted Computing technology", Retrieved at <<http://www.ma.rhul.ac.uk/static/techrep/2006/RHUL-MA-2006-10-v2.pdf>>, Proceedings of the 3rd ACM workshop on Scalable trusted computing, Mar. 7, 2008, pp. 33.

(Continued)

*Primary Examiner* — Olusegun Goyea
(74) *Attorney, Agent, or Firm* — Damon Rieth; Jim Ross; Micky Minhas

(57) ABSTRACT

A chip card payment processor interface component exposes a plurality of different interfaces for a plurality of different chip card payment processors. A chip card peripheral device interface component exposes a plurality of different chip card peripheral device interfaces for a plurality of different chip card peripheral devices. A payment services component can thus interact with the plurality of different chip card peripheral devices in conducting a transaction, and can also interact with a plurality of different chip card payment processors to authenticate and validate the transaction.

20 Claims, 19 Drawing Sheets

(56) References Cited

U.S. PATENT DOCUMENTS

| | | | |
|---|---|---|---|
| 2008/0147550 A1* | 6/2008 | Morsillo et al. | 705/44 |
| 2008/0270514 A1* | 10/2008 | Soares Pi Farias | 709/202 |
| 2009/0037940 A1* | 2/2009 | Ng et al. | 719/327 |
| 2009/0319382 A1* | 12/2009 | Shah et al. | 705/17 |
| 2010/0153267 A1 | 6/2010 | Ghaidan et al. | |
| 2010/0274722 A1 | 10/2010 | Roberts et al. | |
| 2011/0112968 A1 | 5/2011 | Florek et al. | |
| 2011/0161186 A1* | 6/2011 | Shah et al. | 705/16 |
| 2011/0202413 A1* | 8/2011 | Stewart et al. | 705/16 |
| 2012/0054050 A1* | 3/2012 | Ziegler et al. | 705/21 |

OTHER PUBLICATIONS

Meier, Fabian, "The Abrantix EMV Level 2 Kernel—a Software Module for EFTPOS Terminals", Retrieved at <<http://www.abrantix.com/downloads.html?file=tl_files/abrantix/download/product/Abrantix%20EMV%20Kernel%20Whitepaper%20v1_0.pdf>>, Mar. 30, 2009, pp. 1-16.

"EMV", Retrieved at <<http://en.wikipedia.org/wiki/EMV>>, Retrieved Date: Sep. 26, 2011, pp. 13.

\* cited by examiner

| Val | Type | Description |
|---|---|---|
| 0 | Normal | General tender types |
| 1 | Card | Card types includes:<br>Credit<br>Debit<br>Loyalty<br>Corporate cards |
| 2 | Check | Check type |
| 3 | Customer | Customer account type |

FIG. 8

| POSHARDWAREPROFILE ||
|---|---|
| PK | PROFILEID |
| PK | DATAAREAID |
| | NAME<br>EFT<br>EFTDESCRIPTION<br>EFTSERVERNAME<br>EFTSERVERPORT<br>EFTCOMPANYID<br>EFTUSERID<br>EFTPASSWORD<br>... |

FIG. 10

PLUG-IN BASED CHIP CARD PAYMENTS

BACKGROUND

Some current retail establishments include at least one store that has a plurality of different point of sale (POS) lanes or cashiers where customers can make purchases. It is not uncommon for the devices at each of the POS lanes to be connected to one another in what is referred to as a back office portion of the store. In such a set-up, POS lanes often include computerized registers or other devices that run POS applications and the back office may be connected to the POS devices through a network, which can either be a hardwired network or a wireless network. The back office components often run a back office program that can be used to configure some of the point of sale components and to aggregate sales data, and other data, from the point of sale components.

It is also common for retail organizations to include a plurality of different stores. The back office components of each of the different stores may be connected to one another at a headquarters facility that runs a headquarters system. The headquarters system often aggregates sales and other data transmitted to it form the retail locations by the back office components of each of the stores.

The retail establishments are often required to support a variety of different payment methods. For instance, most retail establishments are able to accept cash and checks as payment options, but they can also often accept credit cards or debit cards as well. In accepting credit card or debit card payments, the retail establishments are often required to interact with a payment processor (which may be an entity that handles payments for various banks, or which may be the bank itself) in conducting sales transactions. There are a variety of different types of credit cards and debit cards. Some are magnetic stripe cards where information is read by a magnetic strip reader at the point of sale. Other cards are chip cards which include an embedded integrated circuit chip that interacts with a chip card reader at the point of sale. The chip cards often include memory that stores a fairly large amount of data, and it includes components that can be programmed, that include a relatively high degree of security, and that can be read.

During an electronic funds transfer transaction (e.g., a credit card or debit card transaction), there may be several communication cycles between the card reader and the payment processor. These cycles may be used to authorize or validate the card and then authorize or validate the payment amount charged to the card, among other things.

There are currently a variety of different payment processors that handle payment processing for chip card payments. Each of them currently specifies a given hardware reader that is to be used in transmitting data from the chip card to the payment processor. That is, each payment processor specifies a hardware device (for reading data from the chip card) that it will support. While the payment processors may not, themselves, manufacture the hardware reader devices they specify, they often contract with hardware manufacturing companies that do manufacture the devices.

Therefore, if a retailer wishes to use a given chip card payment processor, that retailer must currently buy chip card the hardware device specified by that given payment processor. This requires the applications at the point of sale, in the back office, and often at the headquarters, to be hard coded to work with only a single device driver.

EMV is a standard for interoperation of integrated circuit cards (chip cards) and integrated circuit (IC) capable POS terminals and automatic teller machines (ATMs) for authenticating credit and debit card payments. The EMV standard defines the interaction at the physical, electrical, data and application levels between IC cards (or chip cards) and IC card processing devices (or readers) for financial transactions. IC card systems based on the EMV standard are being used at various locations and may also be referred to as "IC credit" systems and "Chip and PIN" systems.

The discussion above is merely provided for general background information and is not intended to be used as an aid in determining the scope of the claimed subject matter.

SUMMARY

A payment processor interface component exposes a plurality of different interfaces for a plurality of different chip card payment processors. A peripheral device interface component exposes a plurality of different peripheral device interfaces for a plurality of different peripheral devices. A payment services component can thus interact with the plurality of different peripheral devices in conducting a chip card transaction, and can also interact with a plurality of different chip card payment processors to authenticate and validate the transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 8-12 illustrate various embodiments of a data model.

DETAILED DESCRIPTION

Figure 1:
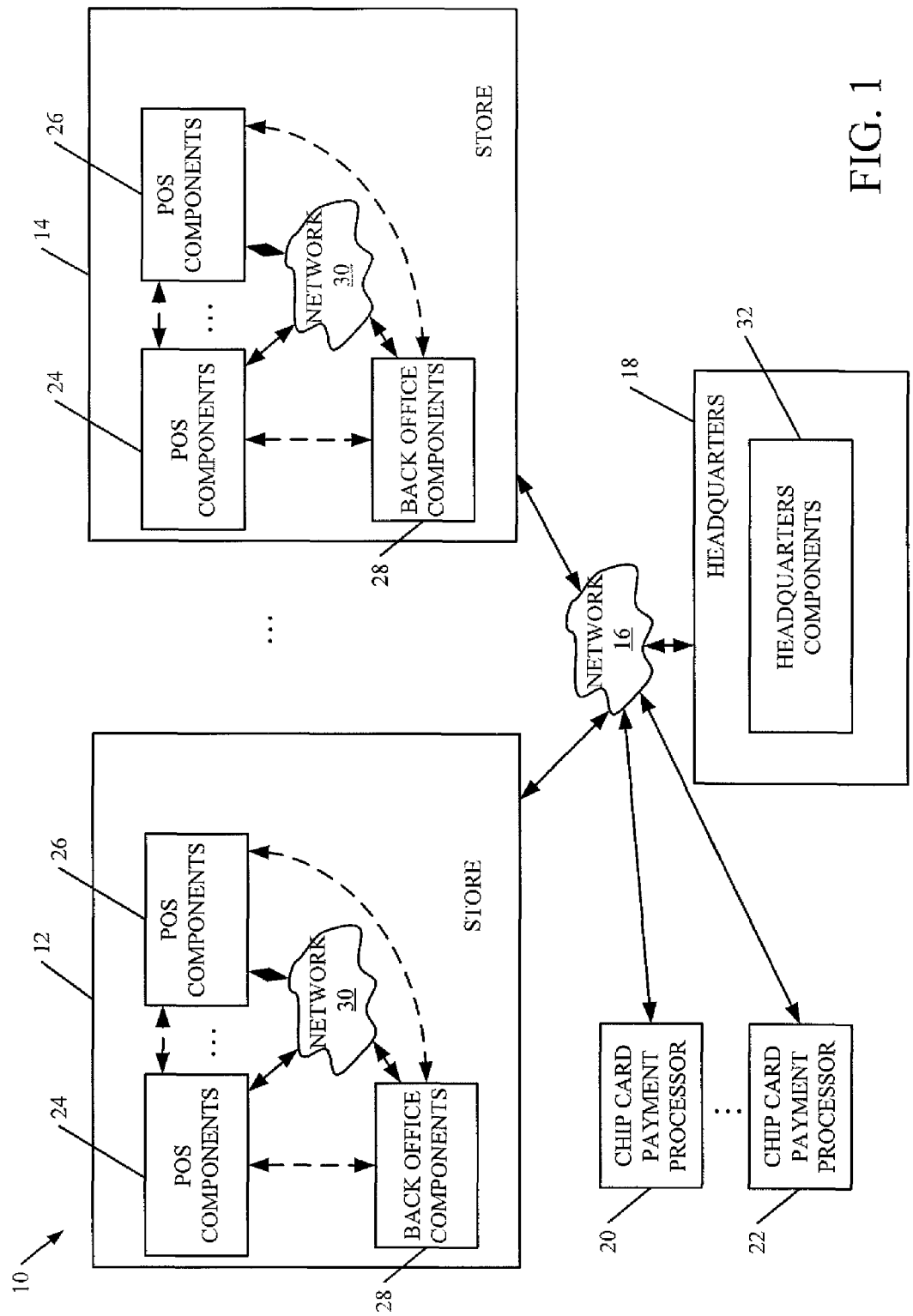
FIG. 1 is a block diagram of one illustrative retail establishment.

FIG. 1 is a block diagram of one exemplary retail establishment 10. In the embodiment shown in FIG. 1, retail establishment 10 includes a plurality of stores 12 and 14 that are connected through network 16 to a headquarters facility 18. In one embodiment, network 16 is a wide area network, such as the internet.

FIG. 1 also shows that a plurality of chip card payment processors 20 and 22 can also be connected to stores 12 and 14 and headquarters components 32 of headquarters 18 through network 16. In the embodiment shown in FIG. 1, both stores 12 and 14 each have points of sale that include POS components 24 and 26. They are illustratively connected to a back office system that has back office components 28, through a network 30, or directly (as indicated by the dashed arrows). In the embodiment shown in FIG. 1, network 30 may be a wide area network or a local area network, and it can be a wireless network or a hardwired network.

By way of example, a point of sale may be a checkout lane so that point of sale components 24 include some or all of a cash register, a cash drawer, a barcode scanner, a radio frequency identifier (RFID) reader, a keyboard, a pin pad, and a credit or debit card hardware device, such as a chip card reader that communicates with a chip card to read data from, and write data to, the chip card. These are examples only, and POS components 24 and 26 may include fewer than these components or more as well. For instance, the POS components may also include a scale in a grocery store as well as one or more various printers and display devices, etc.

In any case, POS components 24 and 26 are illustratively set up so that a customer can make a purchase using a chip card that comprises a credit or debit card. Those purchases are illustratively authenticated by interacting (when necessary) with a payment processor 20 or 22 that is processing payments and electronic funds transfers performed using the given chip card. This can be done by the POS components 24 and 26 communicating with the respective payment processor 20 or 22 directly over network 16, or it can be done by the POS components 24 and 26 communicating with payment processor 20 or 22 through back office components 28. In either case, the selected chip card payment processor (such as payment processor 20) may eventually validate the chip card and authorize the transaction. In that case, POS components 24 illustratively post the transaction to a data store in the corresponding retail store 12 or 14 and print a receipt for the customer.

It can thus be seen that POS components 24 and 26 include one or more POS applications that run the various hardware devices at each respective point of sale. The POS applications, in turn, often communicate with a back office application in back office components 28. The back office components 28 may also include data storage and communication components which can be used to aggregate the sales and other transaction data from POS components 24 and 26 and communicate those to headquarters components 32 over network 16. Headquarters components 32 often include data storage and processing components which can be used to generate reports and provide a host of other services to stores 12 and 14 or to administrative personnel at headquarters 18.

In one embodiment, either back office components 28 or headquarters components 32 deploy a payment services system (or platform) that allows an individual to configure a plurality of different points of sale to each operate with one or more of a variety of different hardware components that interact with chip cards. Thus, at a single location, an individual can configure multiple different points of sale so that they can use one or more of a plurality of different selected hardware devices for performing chip card credit or debit card payments. This can be done by exposing the interfaces used by the selected hardware devices, so they can communicate with the system (platform).

Similarly, in one embodiment, either back office components 28 or headquarters components 32 also include a payment services system (or platform) that will enable each retail location (or store) to selectively use one or more of the plurality of different chip card payment processors 20 and 22. The payment platform illustratively exposes interfaces to the selected payment processors so they can communicate with the system (or platform). Therefore, regardless of which hardware devices and which payment processors are used, the financial transaction can be performed.

Figure 2:
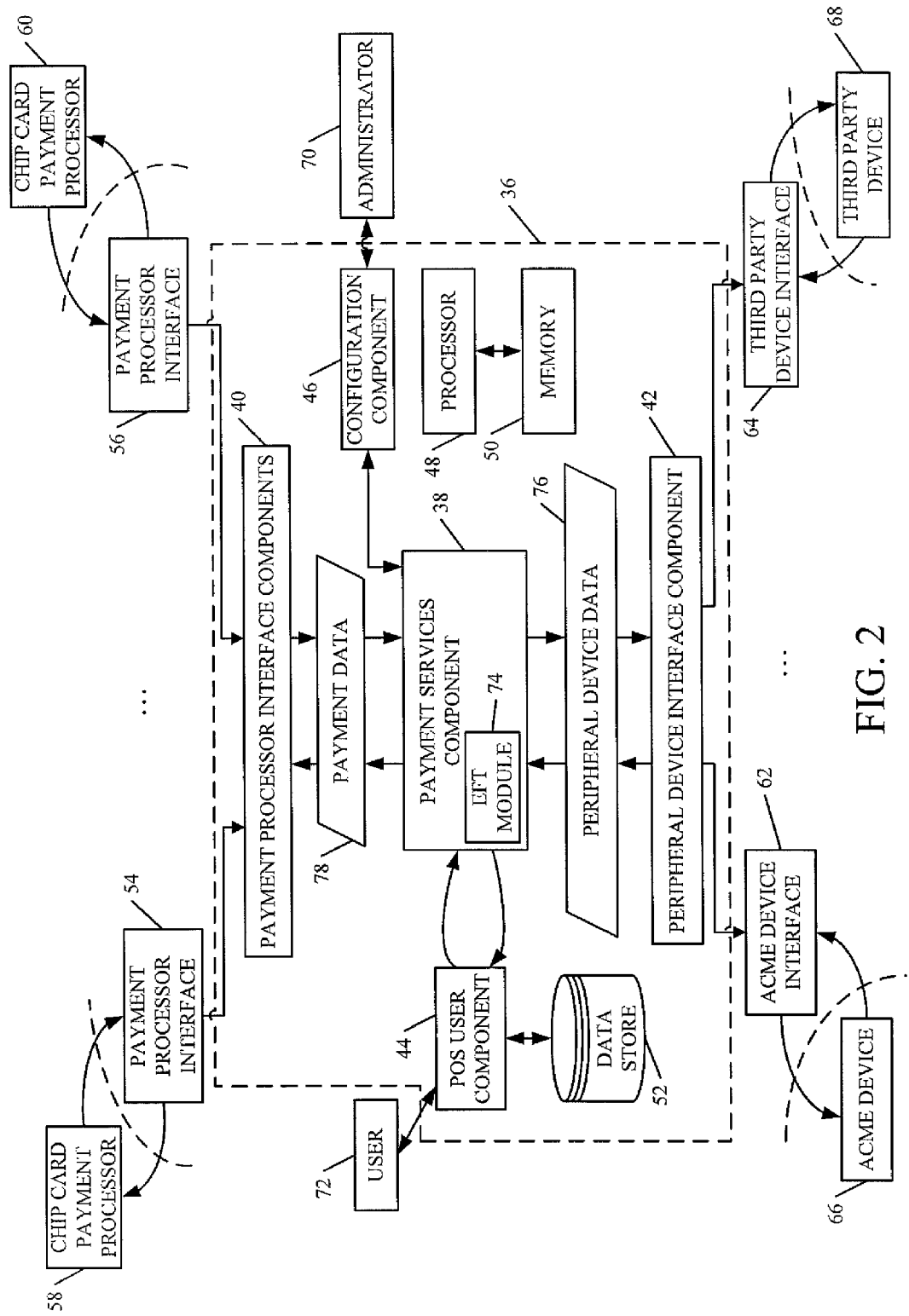
FIG. 2 is a block diagram of a payment system that can interact with a variety of different chip card readers and a variety of different payment processors.

FIG. 2 is a block diagram of one illustrative embodiment of a payment system (or platform) 36. It will be appreciated that payment service system 36 can be deployed on back office components 28 or headquarters components 32, or both. It should also be noted that, while various components are shown in system 36, functionality of those components can be combined and performed by a single component, or they can be further divided and performed by multiple different components. Similarly, it will be noted that while the components in system 36 are described herein as residing on back office components 28 or headquarters component 32, it should be noted that they can be distributed so that some parts of system 36 reside on back office components 28 while others reside on headquarters component 32, or even on POS components 24 and 26. However, for the sake of example only, system 36 will be described herein as residing on back office components 28.

In any case, the embodiment in FIG. 2 shows that payment service system (or platform) 36 includes payment services component 38, payment processor interface component 40, peripheral device interface component 42, POS user component 44, configuration component 46 and processor 48 with associated memory 50. FIG. 2 also shows that system 36 illustratively includes data store 52. In the embodiment shown in FIG. 2, payment processor interface component 40 is shown exposing two different payment processor interfaces 54 and 56 which interface with corresponding chip card payment processors 58 and 60, respectively. FIG. 2 also shows that peripheral device interface component 42 exposes a plurality of different hardware device interfaces 62 and 64 which interface with corresponding chip card reader hardware devices 66 and 68, respectively.

In one embodiment, processor 48 includes a computer processor and associated timing circuitry that, in conjunction with memory 50, can be activated by and facilitate the functionality of, various other components on system 36. In addition, it will be noted that FIG. 2 shows an administrator 70 that interacts with configuration component 46, and a user 72 that interacts with POS user component 44.

In the overall embodiment, configuration component 46 illustratively presents user interface displays to administrator 70, with user input mechanisms that allow administrator 70 to provide user inputs to configure system 36 to work with various hardware devices 66 and 68 (various chip card readers) and to interact with various payment processors 58 and 60. Also, POS user component 44 illustratively provides user interface displays to user 72, along with user input mechanisms, that allow user 72 to either conduct a purchase transaction (or other financial transaction) or to facilitate that. For instance, if POS user component 44 is on a self checkout point of sale, then user 72 may be a customer. However, if POS user component 44 is deployed at a cashier stand, then user 72 may be a cashier. In any case, POS user component 44 illustratively performs functionality to allow a user 72 to conduct a financial transaction (such as a purchase) at a point of sale. POS user component 44 interacts with payment services component 38 (which itself includes electronic funds transfer (EFT) module 74) to perform the transaction.

In an example where a user wishes to perform a chip card transaction, there is normally a sequence of communications which must be undertaken between the peripheral device that reads the credit or debit card and the chip card payment processor that processes the payments using that card. In conventional systems, the peripheral device communicates directly with the payment processor so they must communicate using the same communication format or protocol. However, the present system interposes payment platform 36 between the peripheral device and payment processor. Platform 36 can be configured to expose selected interfaces to communicate with certain peripheral devices, and other interfaces to communicate with certain payment processors. In this way, any supported peripheral device can be used with any supported payment processor, regardless of whether the two communicate using the same or different communication protocols or formats. A number of different, exemplary communication sequences are described in detail below with respect to FIGS. 7A and 7B.

Assuming that user 72 wishes to perform a chip card transaction, then the user must insert the chip card in a chip reader hardware device, such as device 66 or device 68. In the embodiment shown in FIG. 2, device 66 is a device manufactured by the ACME Company, while device 68 is a hardware device manufactured by a third party. In either case, the hardware reader device 66 or 68 communicates the information 76 read from the card, through an appropriate device interface 62 or 64 exposed by interface component 42, to payment services component 38. Payment services component 38 provides that information, as payment data 78 to the corresponding payment processor 58 and 60 through the corresponding payment processor interface 54 or 56. The selected payment processor 58 or 60 interacts with payment services component 38 through interface component 40 so that the transaction can be completed. Therefore, as long as components 40 and 42 have the appropriate interfaces, system 36 can be configured to operate with substantially any card reader and any payment processor, regardless of who manufactured the card reader and regardless of whether the payment processor and the card reader communicate using the same format.

Figure 3:
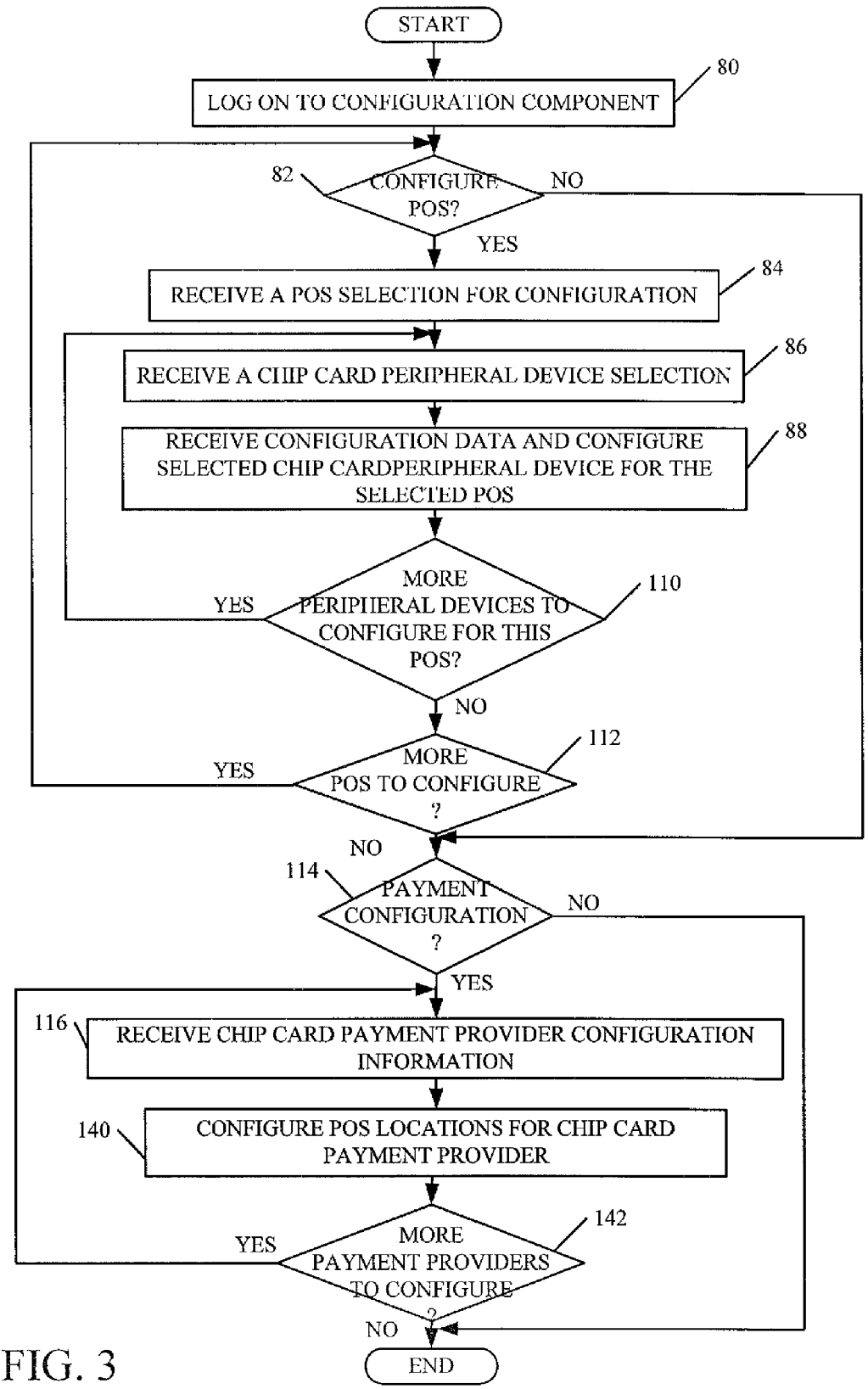
FIG. 3 is a flow diagram illustrating one exemplary embodiment of configuring the system shown in FIG. 2.

FIG. 3 is a flow diagram illustrating one embodiment for configuring payment services system 36 so that it can interact with specific ones of hardware devices 66 and 68, and with specific ones of payment processors 58 and 60, regardless of the particular communication format used by them. FIGS. 2 and 3 will now be described in conjunction with one another.

Administrator 70, in order to configure system 36, first logs on to system 36 through configuration component 46. This can include providing desired authentication information, or other logon information. Logging on is indicated by block 80 in FIG. 3.

Once administrator 70 is logged on, configuration component 46 illustratively provides suitable user interfaces, with user input mechanisms, to administrator 70 that allows administrator 70 to provide inputs to configure various portions of system 36. In one embodiment, configuration component 46 first allows administrator 70 to provide an input indicating that the administrator 70 wishes to configure one or more of the set of POS components 24 or 26. This is indicated by block 82 in FIG. 3. This can be done, for example, by providing a user interface which allows the administrator to select a tab or select from a dropdown menu, or otherwise indicate that the administrator 70 wishes to configure something at a point of sale, in the POS components 24 or 26.

Next, configuration component 46 receives an input from administrator 70 that is indicative of the administrator 70 selecting one of the POS components 24 or 26 for configuration. This can also be done in a wide variety of different ways. For instance, the administrator 70 can be provided with a list of POS components 24 or 26 so that the administrator can simply select one from the list. Alternatively, the administrator can be provided a set of POS components 24-26 in a dropdown menu, with check boxes, or with another input mechanism that allows the administrator 70 to select one or more POS components for configuration. Receiving the input from the administrator indicating that the administrator has selected a set of POS components 24-26 for configuration is indicated by block 84 in FIG. 3.

Figure 4A:
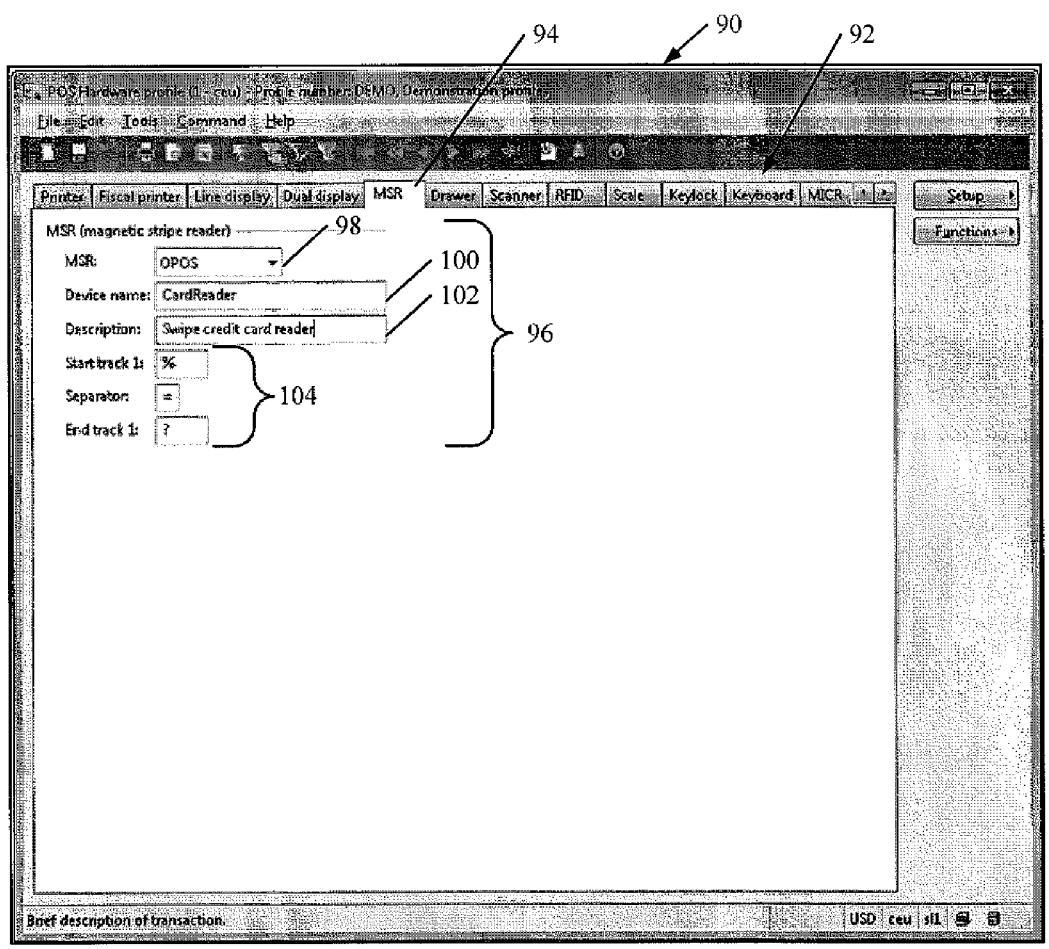
FIGS. 4A and 4B show illustrative user interfaces generated in configuring a reader device and a payment processor.

Configuration component 46 then provides a user interface display to administrator 70 that is representative of the selected set of POS components 24-26. This allows administrator 70 to select one of those components (e.g., a specific chip card reader peripheral device) for configuration. By way of example, FIG. 4A shows a user interface display 90 that represents a set of POS components 24-26. It can be seen that user interface display 90 has a set of tabs 92, each of which can be selected by the administrator for configuration It can be seen from display 90 that tabs 92 each represent a physical peripheral device or function that can be performed at POS components 24, and each of which can be configured. For instance, some of the components listed under tabs 92 include printer, fiscal printer, line display, dual display, magnetic strip reader (MSR), cash drawer or drawer, a scanner, RFID, scale, key lock, keyboard, etc. In the embodiment shown in FIG. 4A, administrator 70 has selected a magnetic stripe reader (MSR) tab 94. This allows the administrator to configure the MSR device. Receiving a peripheral device selection is indicated by block 86 in FIG. 3.

Configuration component 46 then displays a set of fields or selectable parameters (indicated by 96 in display 90 of FIG. 4A) that receive user inputs of configuration data that can be used to configure the selected peripheral device. For instance, fields or parameters 96 include a dropdown box 98 that lists various types of magnetic stripe readers. These can also list chip card readers, where that tab is selected. Field 100 allows the administrator to provide a device name, and field 102 allows the administrator to provide a device description. The set of fields 104 allow the administrator to configure specific parameters corresponding to the magnetic stripe reader (or for a chip card reader where that tab is selected), such as a marker that delineates a starting track and an ending track, as well as a separator.

Once administrator 70 has entered the configuration information, configuration component 46 provides an indication of which particular device interface 62-64 should be exposed to communicate with the selected peripheral device and, configures the selected peripheral device at the selected point of sale. For instance, assume that administrator 70 has selected the point of sale which includes the ACME chip card reader 66 (shown in FIG. 2). User interface display 90 allows administrator 70 to select from dropdown box 98 that the chip card reader is a ACME device chip card reader. This information is entered into payment services component 30 which transmits it to POS user component 44 that, in turn, stores it in data store 52. Component 38 also transmits the peripheral device data 76 to peripheral device interface component 42 which, in turn, stores an indication that, for this point of sale, peripheral device interface component 42 is to expose the ACME device interface 62 to ACME device 66 so that device 66 can adequately communicate, in its expected protocol and communication format, with peripheral device interface component 42. Providing the configuration data and configuring the selected point of sale for a given chip card peripheral device is indicated by block 88 in FIG. 3.

It should be noted that this process can be repeated for each peripheral device at each point of sale. Therefore, at block 110, configuration component 46 determines whether the user wishes to configure more peripheral devices for this selected point of sale. If so, processing reverts to block 86.

It should also be noted that this process can be repeated for each point of sale. Of course, the process can also be performed once and then propagated to multiple points of sale. However, for the sake of the present example, it is assumed that administrator 70 is configuring each individual point of sale (or the POS components in each set of POS components 24-26) differently. Therefore, once one of the sets of POS components 24 have been configured, configuration component 46 determines whether the administrator 70 wishes to configure more points of sale (or other sets of POS components 24-26). This is indicated by block 112 in FIG. 3. If so, processing shifts back to block 84 where the administrator selects a point of sale, and then selects a particular peripheral device at that point of sale, and then configures the system to use an interface to communicate with that particular device.

It should also be noted that configuration component 46 can allow administrator 70 to configure which particular chip card payment processor 58-60 is to process payments received from the chip card reader peripheral devices of each point of sale 24-26. That is, configuration component 46 allows administrator 70 to provide configuration information to payment services component 38 that configures payment processor interface component 40 to process payments through a selected payment processor 58 or 60 for the peripheral device 66 at a selected point of sale.

Figure 4B:
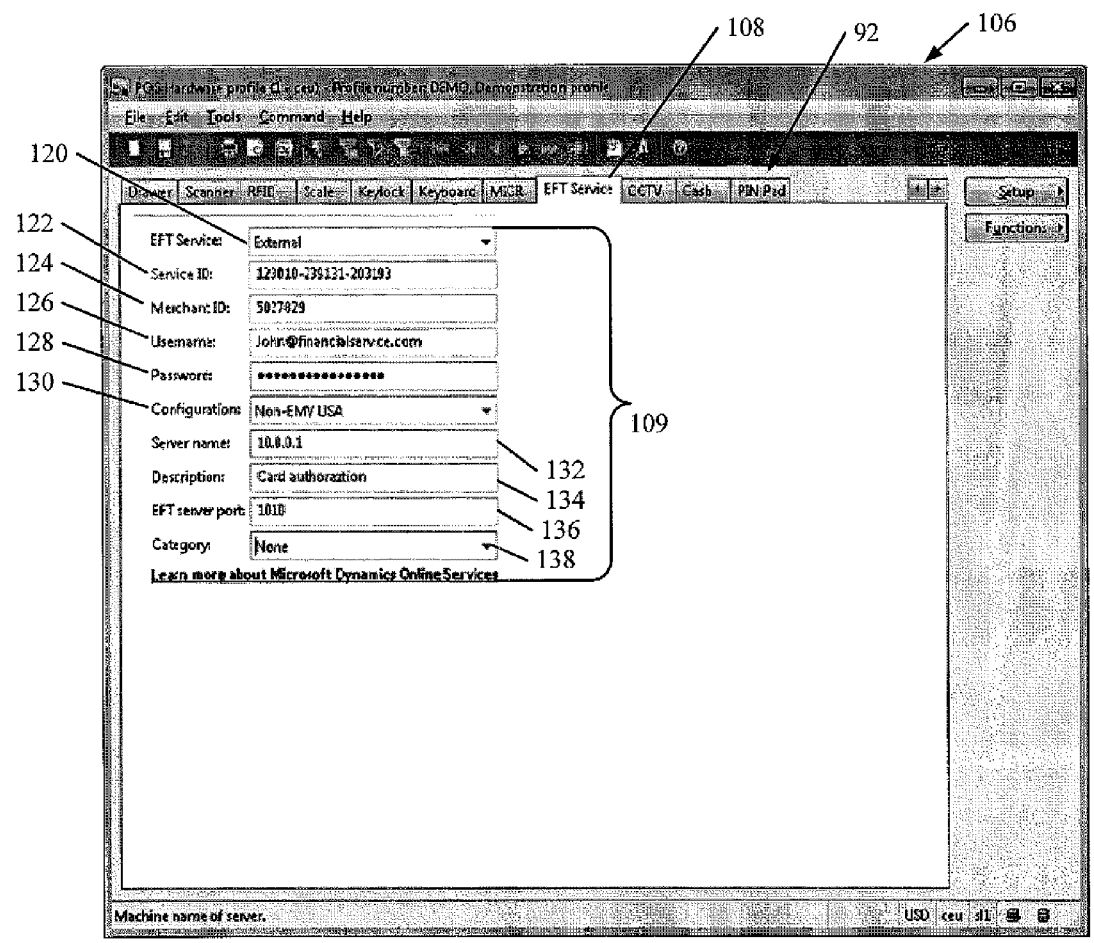

By way of example, assume that administrator 70 wishes to configure a point of sale so that all chip card payments received through ACME card reader device 66 are processed by chip card payment processor 58. That being the case, from the interface 90 shown in FIG. 4A, the administrator 70 selects a different tab. This is indicated by user interface display 106 shown in FIG. 4B. It can be seen that the user interface 106 is similar to user interface display 90, except that the tabs 92 have been shifted to the left, so that the right most tabs 92 can be seen. Administrator 70 has selected the EFT service tab 108. EFT service tab 108 allows administrator 70 to input configuration information for processing chip card electronic funds transfers using the ACME device 66. In response to the administrator 70 selecting tab 108, configuration component 46 displays a set of fields or parameters 109 that allow the user to choose from a number of chip card payment processors 58-60 and link them to the specific point of sale and the specific peripheral device 66 where payments are to be made. Of course, it should be also noted that this payment configuration process can be performed once and applied to multiple points of sale or multiple stores. However, for the sake of the present example, it is assumed that administrator 70 is configuring each set of point of sale components 24 individually, so that administrator 70 is specifying a payment processor for each chip card peripheral device that requires electronic funds transfer services.

Determining whether administrator 70 wishes to input payment configuration information, and receiving that information, is indicated by blocks 114 and 116 in FIG. 3. It can be seen from FIG. 4B that the set of fields and parameters 109 include an EFT service field 120 that allows the user to specify, such as through a dropdown menu, a specific EFT service (or payment processor) that is to be used for processing chip card payments using this particular peripheral device or for this particular set of POS components 24-26. The parameters also include field 122 that allow the administrator 70 to input a service ID, field 124 that allows inputting of a merchant ID, field 126 that allows input of a user name, field 128 that allows inputting of a password, configuration field 130 that allows the administrator to select (such as from a dropdown menu or otherwise) the type of electronic funds transfer service that is being used, server name field 132 that allows the user to specify a server, a description field 134 that allows the administrator to describe the type of EFT service, EFT server port field 136 that allows the user to input a location of the EFT server that is to be used, and a category field 138 that allows the administrator to categorize the present chip card payment processor configuration information, if desired.

When configuration component 46 receives the configuration information, it provides it to payment services component 38 that provides it, in turn, to the POS user component 44 that stores it in data store 52. Then, when a chip card payment is being processed from an electronic funds transfer device (such as chip card reader device 66), not only does peripheral device interface component 42 expose interface 62 so device 66 can communicate with system 36 using a known protocol, but payment processor interface component 40 exposes payment processor interface 54 so that payment data 78 can be transmitted to payment processor 58, using a protocol known to payment processor 58. In this way, administrator 70 has effectively linked a specific payment processor 58 with a specific electronic funds transfer peripheral device 66. Configuring the POS locations for the selected payment processor is indicated by block 140 in FIG. 3.

Again, component 46 determines whether administrator 70 wishes to configure more locations for different payment processors, and this is indicated by block 142. If so, processing reverts to block 116 where the user can enter configuration information for additional payment processors that the user wishes to connect to various POS components.

It should also be noted that, in one embodiment, administrator 70 can configure a single set of POS components to use multiple different payment processors. For instance, administrator 70 can configure a magnetic stripe reader at one of the points of sale to process payments using payment processor 58, while configuring a chip card reader at the same point of sale to process payments through payment processor 60. Similarly, it should be noted that system 36 can communicate with substantially any peripheral device 66-68, as long a peripheral device interface component 42 has the appropriate interface that it can expose to that device. Therefore, if a third party manufacturer manufactures a third party chip card reader peripheral device, one needs only to provide the appropriate third party device interface 64 to peripheral interface component 42, and system 36 can communicate with that third party device 68 using the protocol and communication format (implemented by the interface) expected by device 68. Thus, system 36 is highly extensible in that any number of new peripheral devices can be added, so long as their interfaces are provided to peripheral device interface component 42.

Similarly, any system 36 can communicate with substantially any chip card payment processor, so long as payment processor interface component 40 has the appropriate interface for that payment processor. Since both payment processor interface component 40 and peripheral device interface component 42 communicate with payment services component 38 using the same interfaces and communication mechanisms, the only things that need to change in order to communicate with new chip card payment processors or chip card reader peripheral devices are the interfaces exposed by components 40 and 42. By plugging new interfaces into components 40 and 42 the system can be extended to add additional chip card payment processors or chip card reader peripheral devices, or both. This enhances flexibility and extensibility of system 36.

POS user component 44 can reside on a cash register or other computing device at a point of sale. It illustratively provides user interface components to user 72 who is either a cashier or a customer (in a self checkout lane). POS user component 44 illustratively provides user interface displays to user 72, along with user input mechanisms on those displays, which allow a user to conduct an electronic funds transfer type of transaction (such as a chip card transaction, using a chip card reader, or a similar device).

Figure 5:
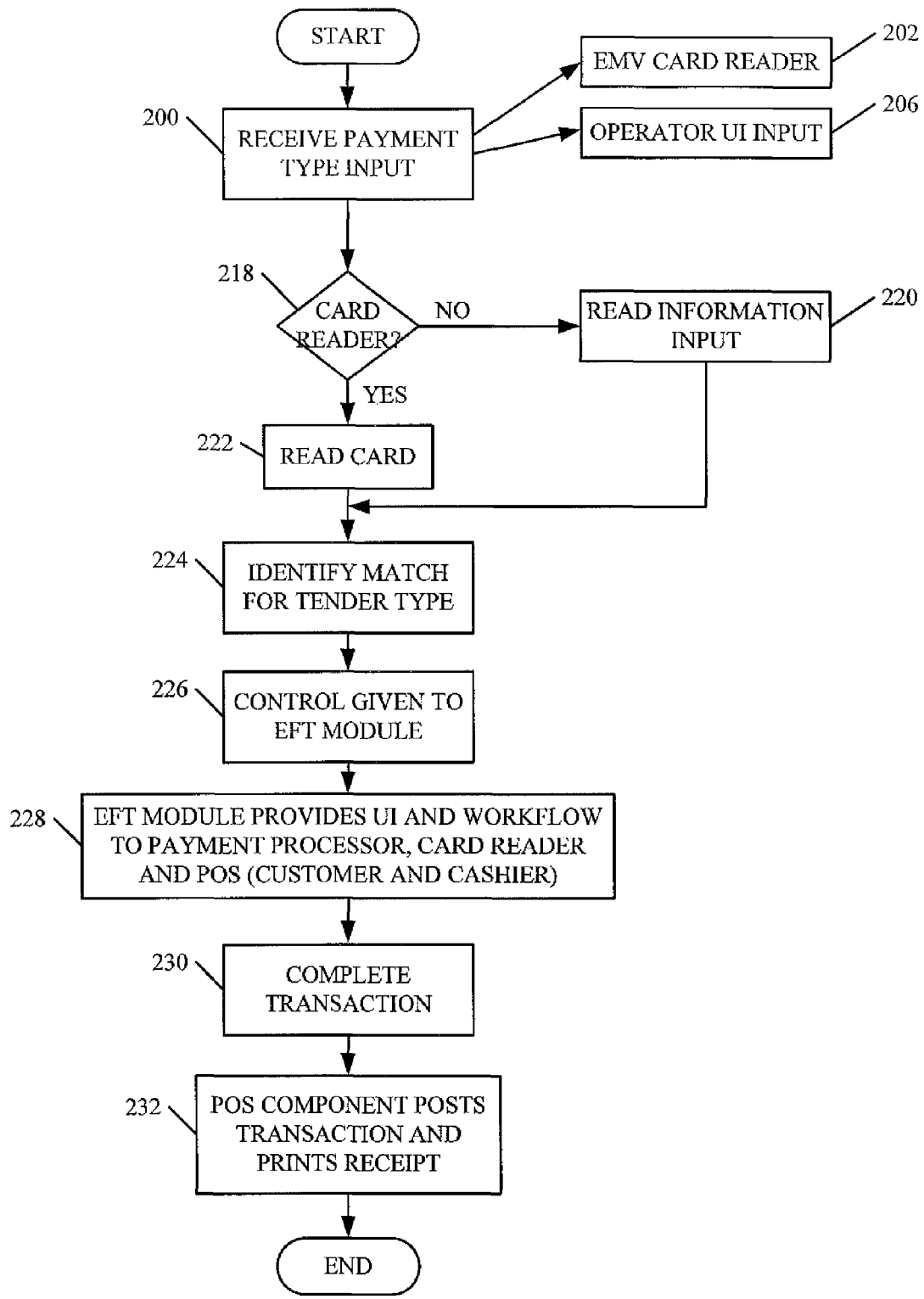
FIG. 5 is a flow diagram illustrating one embodiment for conducting a financial transaction at a point of sale.

FIG. 5 is a flow diagram illustrating one illustrative embodiment of the operation of system 36 in processing an electronic funds transfer payment. Therefore, in one embodiment, POS user component 44 first receives a payment type input from user 72. This is indicated by block 200 in FIG. 5. This can take a number of forms. For instance, the user can simply use a chip card reader to use a chip card or component 44 can receive a user interface input from the user 72. These are separately indicated by blocks 202 and 206 in FIG. 5.

Figure 6A:
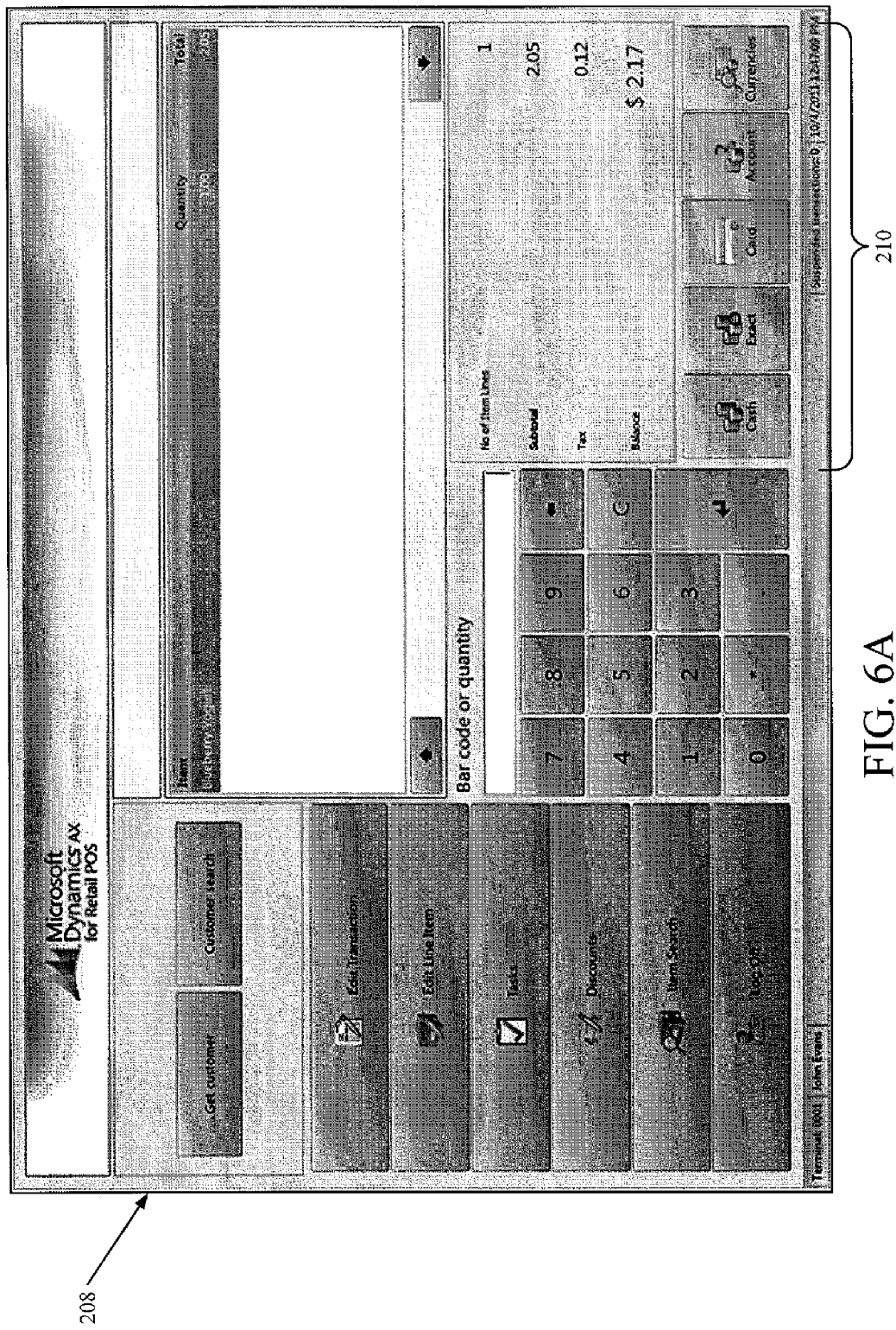
FIGS. 6A and 6B show exemplary user interfaces for conducting a financial transaction.

FIG. 6A shows one illustrative embodiment of a user interface display 208 that can be provided by POS user component 44 to user 72. In the embodiment shown in FIG. 6A, user 72 has scanned an input item using a barcode scanner and the input item is "blueberry yogurt" which has a price of $2.05. User 72 is now ready to checkout. Therefore, the user can illustratively select one of a variety of different payment options, each of which have an associated button shown generally at 201 on display 208. Buttons 210 correspond to a cash transaction, an exact change transaction, an electronic funds transfer (or chip card) transaction, or a transaction that is charged to a customer's account. Buttons 210 also include a currencies button which allows the user to specify a currency with which payment is to be made.

Figure 6B:
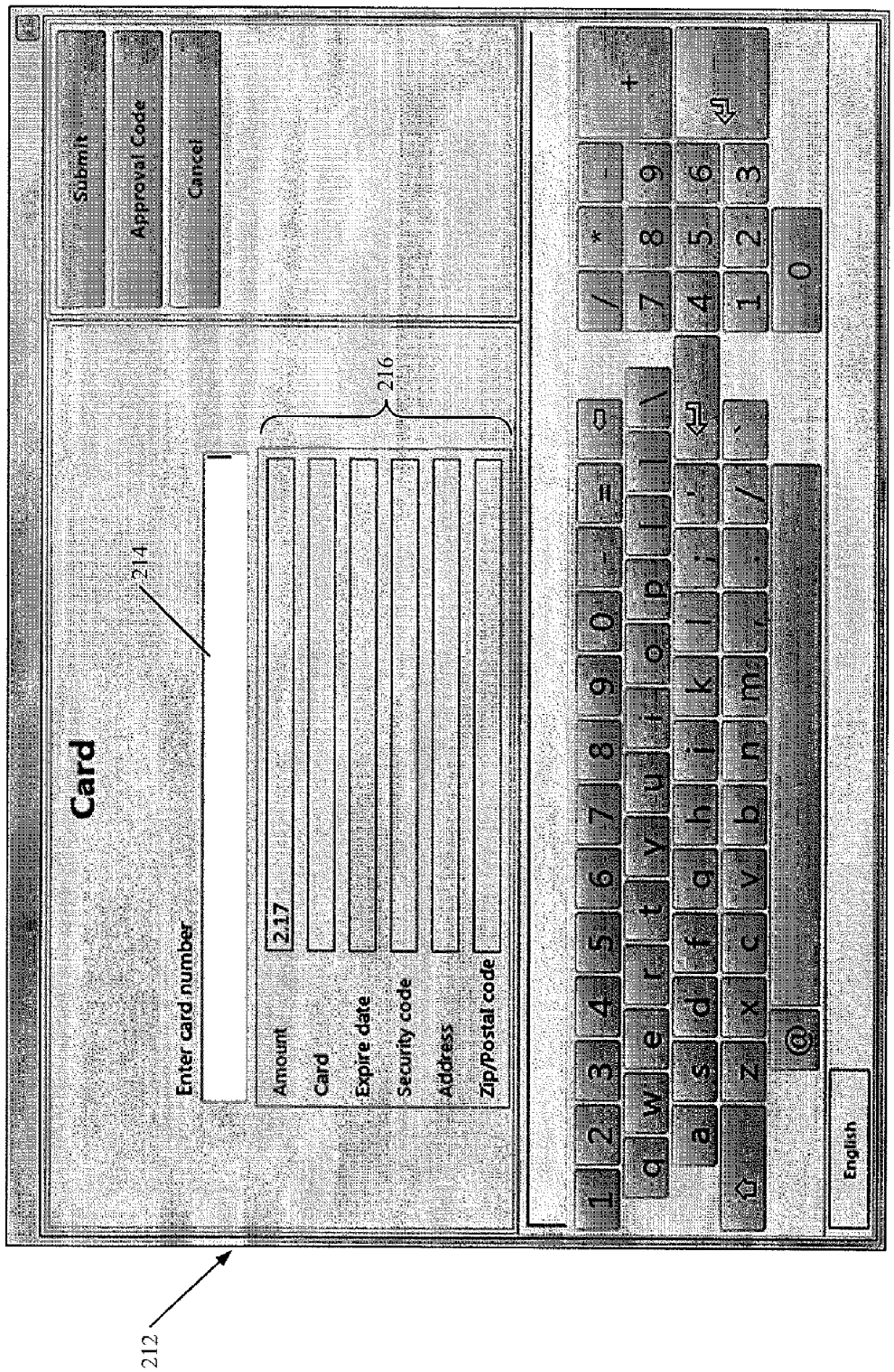

In the embodiment described with respect to FIGS. 5 and 6A it is assumed that user 72 has actuated the "card" button from the buttons 210. In that case, POS user component 44 displays another user interface display, such as display 212 shown in FIG. 6B. Display 212 allows the user 72 to input the card number in field 214, and also includes a plurality of other fields 216 for receiving information corresponding to the credit card. The user can illustratively key in the credit card number into field 214 or the number can be read when the user uses a chip card reader to read the card. This is indicated by blocks 218, 220 and 222 in FIG. 5. In any case, the card number is either read from the card or keyed into field 214.

POS user component 44 then identifies a matching tender type that corresponds to the card number. For instance, the card number and other information read from the card, will indicate whether the card is a Master card, a Visa card, an American Express card, or another type of credit or debit card. Matching the tender type is indicated by block 224 in FIG. 5.

In one illustrative embodiment, because this is an electronic funds transfer using a chip card, it is handled by EFT module 74 that resides on payment services component 38 (such as in a back office location, or in another location in system 10 shown in FIG. 1). Of course, EFT module 74 can reside at each set of POS components 24-26 a well. In any case, in one illustrative embodiment, control is given to EFT module 74, as indicated by block 226 in FIG. 5.

EFT module 74 then controls the work flows and user interfaces provided both to user 72 and to peripheral device 76 as well as to the chip card payment processor 58, that is being used to process the payment. This is indicated by block 228 in FIG. 5. By way of example, there may be multiple different communications required between payment processor 58 and card reader peripheral device 66, in order to process a payment. Two embodiments of this are described below with respect to FIGS. 7A and 7B. For instance, the cashier may be requested to provide customer address and card verification data from the customer. In addition, the card may need to be authorized, the amount of the purchase may need to be authorized, various encryption keys, security and validation codes may need to be transferred back and forth, etc. EFT module does this by providing and receiving peripheral device information 76 to (and from) peripheral device 66 through the appropriate chip card device interface 62. Similarly, EFT module 74 provides and receives payment data to (and from) the appropriate chip card payment processor 58 through payment processor interface 40 by using the appropriate payment processor interface 54.

Figure 7A:
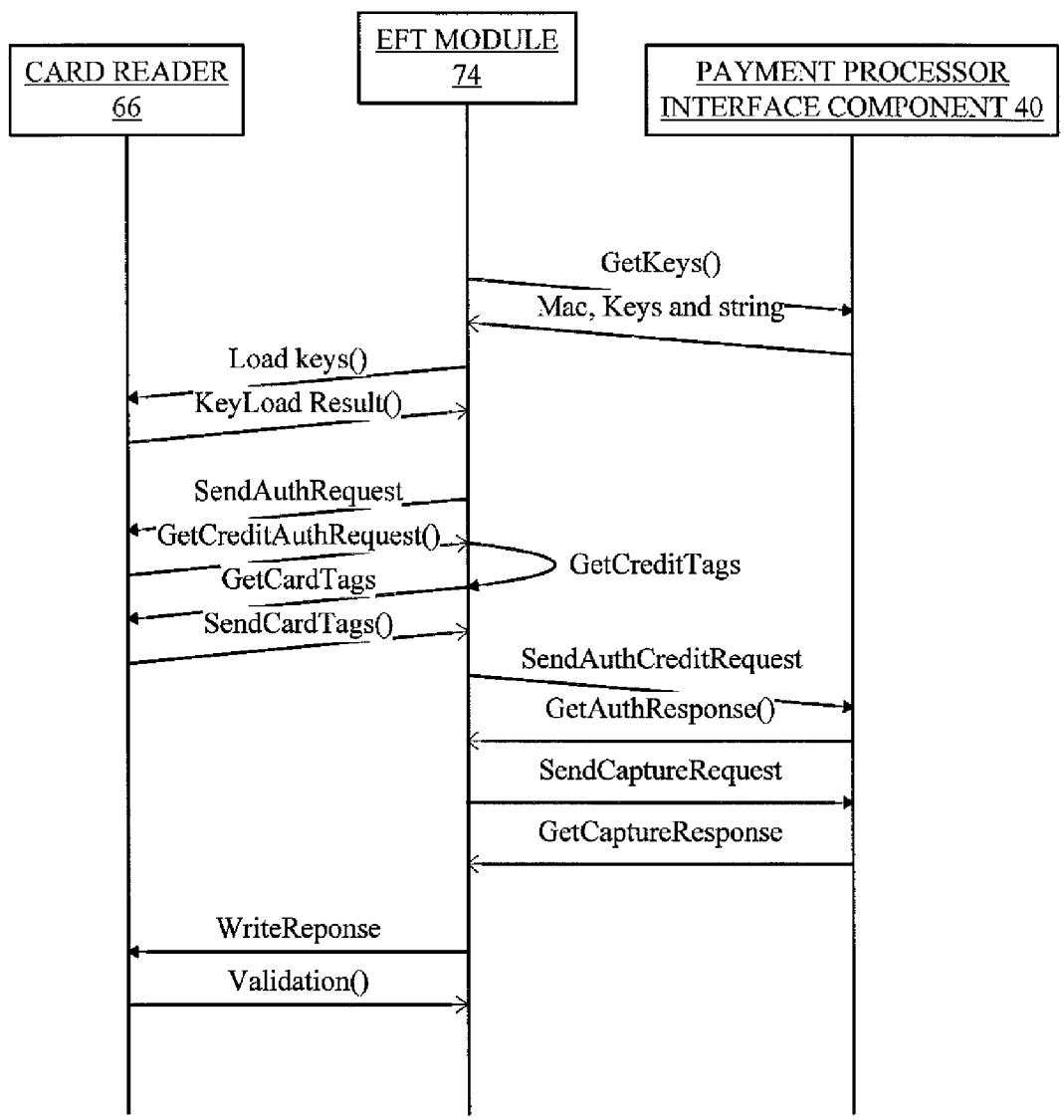
FIGS. 7A and 7B are sequence diagrams for conducting a chip card financial transaction.
Figure 7B:
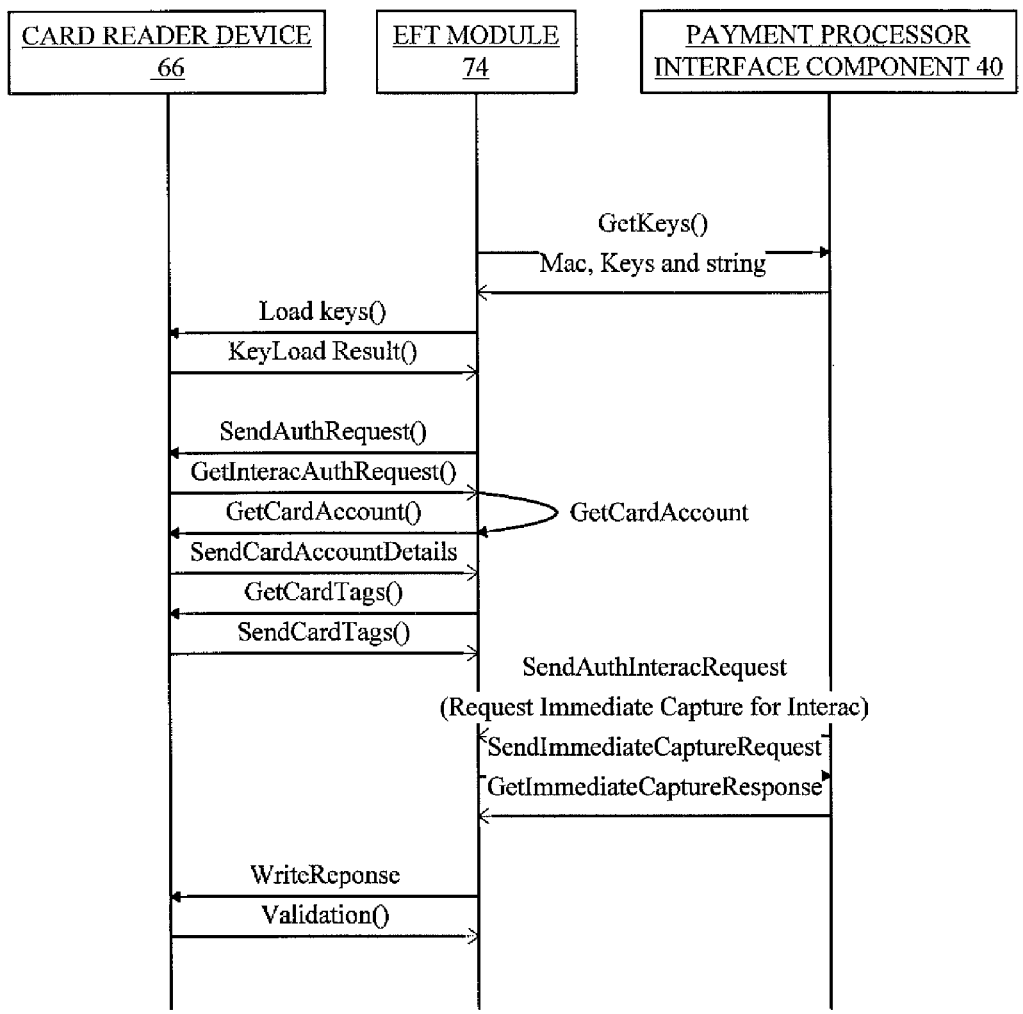

Recall that interfaces 62 and 54 were configured to system 36, for this particular point of sale, during the administrative configuration process described above. Therefore, peripheral device interface component 42 and payment processor interface component 40 know which particular interfaces (62 and 54, respectively) to expose for processing the transaction. FIGS. 7A and 7B are two separate sequences diagrams for facilitating the communication to process a chip card transaction. FIG. 7A shows one illustrative sequence diagram for processing a chip card credit transaction using a Visa or MasterCard, while FIG. 7B shows one illustrative sequence diagram for processing a chip card debit transaction using Interac, which is a Canadian organization for exchanging electronic financial transactions, using a debit card.

In FIG. 7A, EFT module 74 illustratively sends a GetKeys( ) command to the specific payment processor interface component 40 to retrieve keys from the selected payment processor 58. This is done in order to configure the particular card reader 66 that is to be used. In one exemplary embodiment, the payment processor 58 uses security keys, that are loaded onto the card reader and the chip card, so that the payment processor and selected card reader can talk to one another, in a secured way. The keys can, for example, be used by the card reader 66 in order to encrypt data that is transmitted back and forth between card reader 66 and the selected payment processor. Therefore, the GetKeys( ) request requests those keys from the payment processor 58.

This request is transmitted from EFT module 74 to payment processor interface component 40 which transmits it to the desired payment processor 20 in the proper format, through an interface. The payment processor 20 returns, through that interface, the keys and string information necessary to configure the card and card reader 66 for secure communication. This information is transmitted to EFT module 74 which, itself, sends it in a LoadKeys( ) transmission to card reader 66. In one embodiment, this is done through an appropriate interface generated by peripheral device interface component 42.

It should also be noted that, in one embodiment, the security keys written to card reader 66 may illustratively only configure the card reader 66 to process only a predefined number of transactions, before it must be reconfigured. For instance, card reader 66 may be written with security keys so that it can be used in performing (by way of example) up to 1000 financial transactions with chip cards. After the 1000 transactions have been performed by card reader 66, card reader 66 may need to be re-configured to perform additional chip card transactions. In that case, the keys may only need to be retrieved and loaded onto card reader 66 every so often (such as every 1000 transactions).

When card reader 66 has correctly loaded the keys transmitted to it, it sends a KeyLoadResult( ) message back to EFT module 74 indicating that the security keys have now been loaded. These steps are all performed in order to configure card reader 66 so that it can communicate information, in a secure way, with a selected payment processor 58.

Then, as shown in FIG. 7A, the actual financial transaction is processed. EFT module 74 first sends an authorization request to card reader 66 which will collect the necessary information from the chip card and other POS components to define the transaction. For instance, the credit authorization may include the amount of money requested for the transaction, a PIN or other authentication information, etc. This information is returned in a GetCreditAuthorization Request( ) response to EFT module 74. EFT module 74 also sends a GetCardTags( ) command to card reader 66 which reads card tag information and sends it in a SendCardTags( ) response to EFT module 74. By way of example, the card tags can include validation data which has previously been written on the chip card. For instance, some chip cards are only authorized to process up to a certain amount of transactions (in currency value or number) per month. When a transaction is initiated, the tags may define the amount that is remaining, in the authorized total, for a given chip card. That information can be included in the tags which are returned to EFT module 74.

EFT module 74 then communicates with the selected payment processor through payment processor interface component 40. In one embodiment, EFT module 74 first sends SendAuthCreditRequest to the payment processor 58 through interface component 40. This request transmits to the selected payment processor 58 all the data that has been collected from the card through card reader 66. Thus, the information transmitted to the payment processor 58 defines the amount requested for the transaction, along with all other information needed for payment processor 58 to determine whether the payment is authorized.

If it is, payment processor 58 returns the authorization in the GetAuthResponse( ) transmission, to EFT module 74, through interface component 40. EFT module 74 also sends a SendCaptureRequest transmission to payment processor 58, through interface component 40 and gets a GetCaptureResponse( ) back. Capture is the process which actually initiates an electronic funds transfer from one back account to another (such as from the account of the credit card holder to the payment processor or the payment processors bank). For instance, the GetAuthResponse( ) from the payment processor simply authorizes the transaction to go forward. The SendCaptureRequest and GetCaptureResponse confirm that the transaction actually went forward and that it is appropriate to electronically transfer the funds corresponding to the transaction.

The authorization response and the capture response also include additional data that can be written to the chip card, through card reader 66. Thus, EFT module 74 sends a WriteResponse transmission to card reader 66 through the appropriate interface generated by interface component 42. Card reader 66 writes the desired information to the chip card and, when that is successfully accomplished, sends a Validation( ) response back to EFT module 74 indicating that the information has indeed been written to the chip card. By way of example, the chip card may keep a running currency total of the balance remaining, that is authorized for transactions using this given chip card. The information written to the chip card in accordance with the WriteResponse transmission may include rewriting the available balance for this given chip card, by subtracting from the previous balance the amount of the current transaction. Of course, other information can be written to the chip card as well.

FIG. 7B is similar to FIG. 7A, and similar steps are similarly numbered. However, FIG. 7B is a sequence diagram defining one embodiment for conducting a debit card transaction using a chip card. After the authorization request has been received from card reader device 66, EFT module 74 requests the card account information using a GetCardAccount( ) transmission. In response, card reader device 66 returns the account details using SendCardAccount details. The debit card authorization request is then sent to payment processor 58, through interface component 40. However, one difference from the sequence diagram shown in FIG. 7A is that the capture request and response must be immediate. That is, in the embodiment described above with respect to FIG. 7A, for a credit card request, the user's credit card account does not need to be immediately debited when the transaction is authorized. Rather, capture can be performed at the end of the day, or even later, because the bill for the credit card holder is sent to the credit card holder who, him or herself, writes the check or makes the payment to the credit card company. However, with a debit card, the cardholder's account is immediately debited. Therefore, capture must be performed (i.e., the transaction must be configured and the money must be transferred) in close temporal proximity to the actual transaction. Thus, in the embodiment shown in FIG. 7B, there is an immediate capture request initiated by EFT module 74 and the payment processor responds to that request, immediately, through interface component 42. Then, the information is written by card reader 66 to the debit card and once it is properly written, that is validated back to EFT module 74.

EFT module 74 continues processing the transaction, providing communications back and forth between device 66 and payment processor 58, as needed, until the transaction is complete. EFT module 74 then provides information indicating this to POS user component 44. Completing the transaction is indicated by block 230 in FIG. 5.

POS user component 44 then posts the transaction and prints a receipt for user 72. This is indicated by block 232 in FIG. 2.

In sum, it can be seen that system 36 allows pluggable retail interfaces to be plugged into peripheral device interface component 42 to support all different types of chip card hardware devices out of the box. The retailer simply needs to plug the peripheral device into system 36, and so long as the pluggable interface has already been installed in peripheral device interface component 42, the chip card reader peripheral device will be recognized and will work. System 36 also allows pluggable retail interfaces to be added to chip card payment processor interface component 40 to support electronic funds transfer financial services, out of the box, for various chip card payment processors. These two abstractions (the first defining the hardware layer for the hardware device used in the transaction and the second defining the payment gateway which allows multiple different payment processors to process the transaction) provide an integration which works seamlessly from one end (the POS) to the other end (the payment processor). Similarly, the system can be configurable from a central location deployed in back office components 28, or in headquarters component 32, across all retail stores 12-14. The configurations can be updated at runtime, and the EFT module that processes the payment does not need to be modified for various types of chip card reader peripheral devices, or for various chip card payment processors, because the only updating needed is at the interface level.

A detailed description will now be undertaken of various portions of one exemplary data model that can be used in implementing system 36. Of course, it will be appreciated that a wide variety of different data models can be used and the one described is described for the sake of example only. The exemplary portions of the data model are shown in FIGS. 8-12.

FIG. 8 shows a tender type function table. The configuration of payments, as described above, can be set up from back office components 28 which allow the definition of various tender types including credit and debit cards used at all stores 12-14. The tender data is transferred to the store via a data director in back office components 28. The tender type definition in the table shown in FIG. 8 is stored in a table named RBOTenderTypeTable which specifies the tender name, tender type ID and the tender type functions. The tender type function is a value from an enumerator illustratively referred to as RBOTenderFunction.

Figure 9:
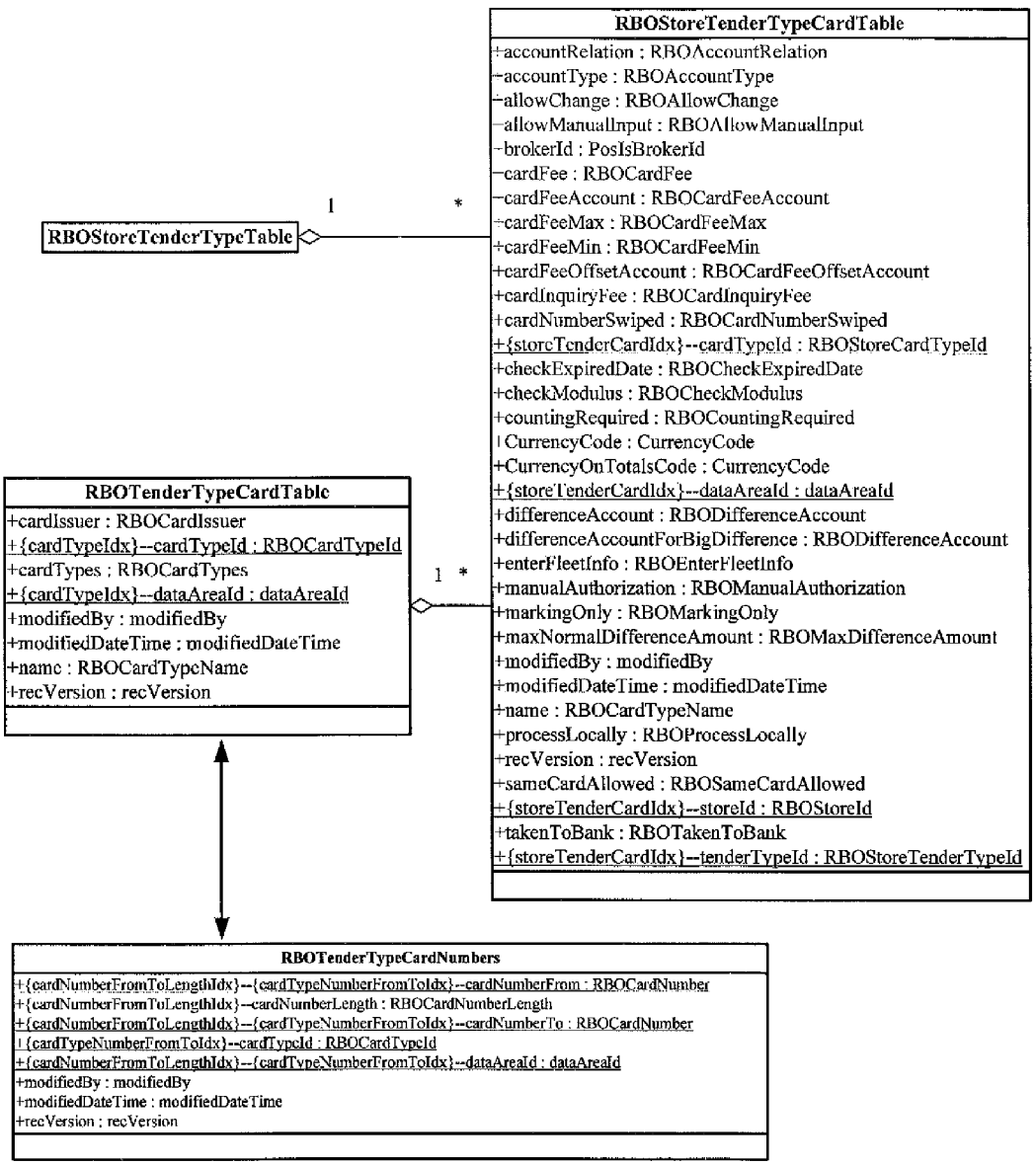

Chip credit or debit card tenders allow specific cards like credit cards or debit cards to be defined at the back office components 28. It also allows configuring multiple work flows for each card type. FIG. 9 shows various components of the data model as well. The cards can be defined in the RBOTenderType card table and properties can be set, per store, in the RBOStoreTenderTypeCard table. The RBOTenderTypeCardNumbers table allows for setting a mask for digit ranges for the various cards. This range can be used at the POS terminal to identify the card type, enable its corresponding workflow and payment posting.

Figure 11:
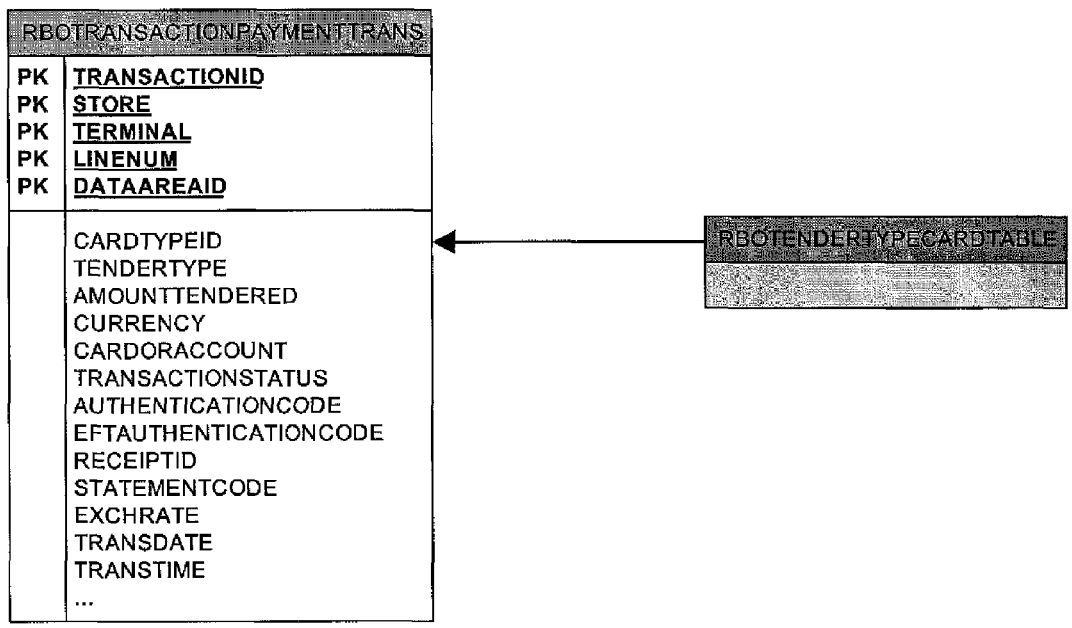
Figure 12:
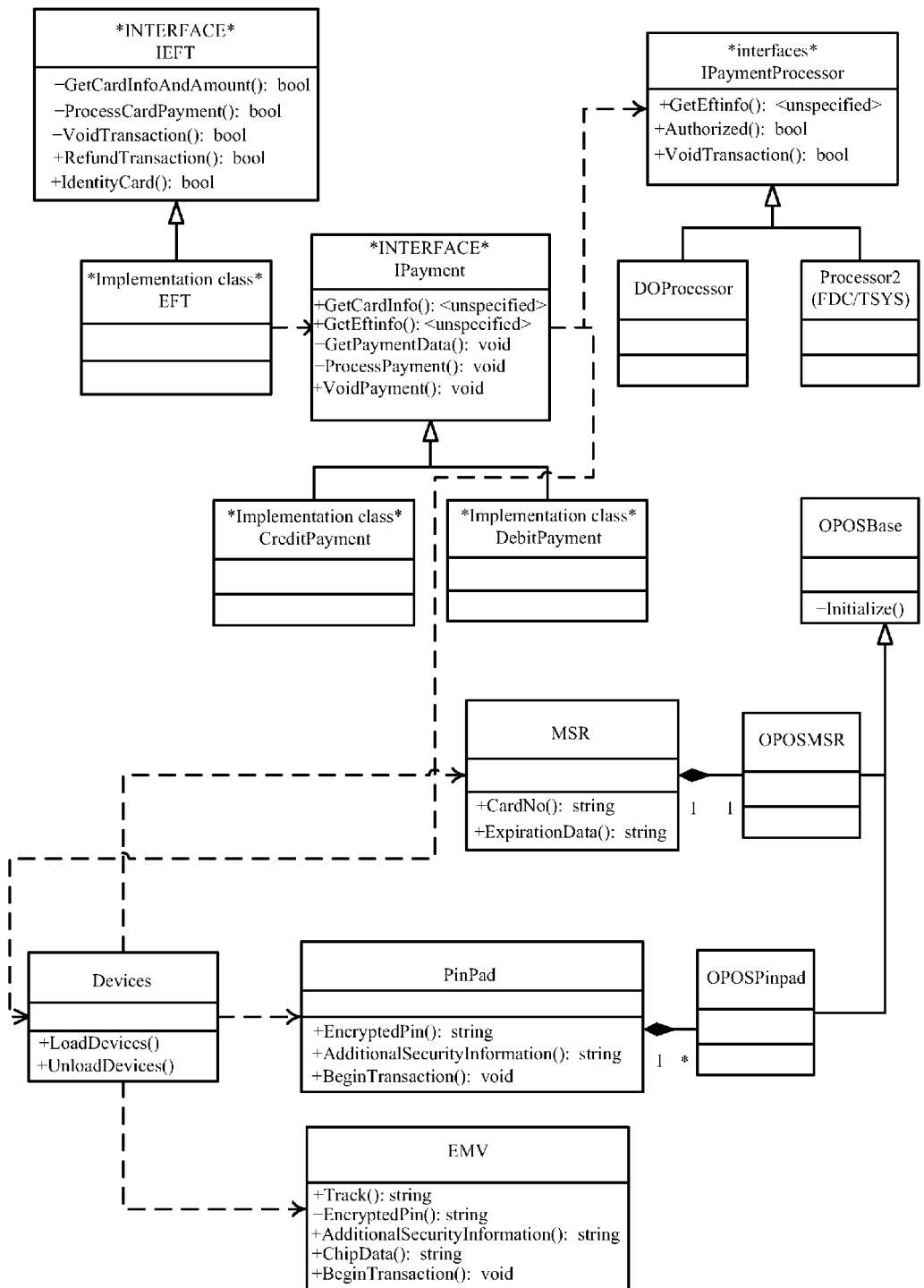

FIGS. 10-12 show additional portions of the data model. The EFT configuration can be set up at the retail back office components 28 as well. This allows the definition of various add-in settings that may be required by the EFT add-ins (the device and payment processor interfaces added to components 40 and 42) locally installed at all POS terminals in POS components 24-26. The EFT configuration data can be transferred to the individual store 12-14 by the data director where it is available for use by the EFT module 74. The table shown in FIG. 10 defines EFT description, server name, server port, company ID, user ID and password entities in the POS hardware profile table.

Payment processing at the POS terminal in POS components 24-26 can be delegated to an EFT module 74 (as described above) that is locally installed at each of the stores 12-14. The EFT module 74 can be shipped, out of the box, with workflows to integrate hardware devices, invoke user interface displays for cashier input, and process payments through payment services component 38. Once a payment is processed for electronic tender types (as discussed above with respect to FIG. 5) data associated with that transaction can be stored locally at POS data store 52. EFT process card data can be stored at the POS terminal at POS components 24-26 in a table referred to as the RBOTransactionPaymentTrans table shown in FIG. 11. Card data is masked to the last four digits before being saved to the database. The table defines a transaction ID, store, terminal, card type ID, tender type, amount tendered, currency, card data, transaction status, authentication code, receipt ID, statement code, exchange rate, transaction date and time entities in the POS database as shown below.

FIG. 12 shows a class and interface description for one embodiment of portions of system 36. It will be noted that while the classes and interfaces shown in FIG. 12 can be used for exemplary purposes, others can be used as well.

Figure 13:
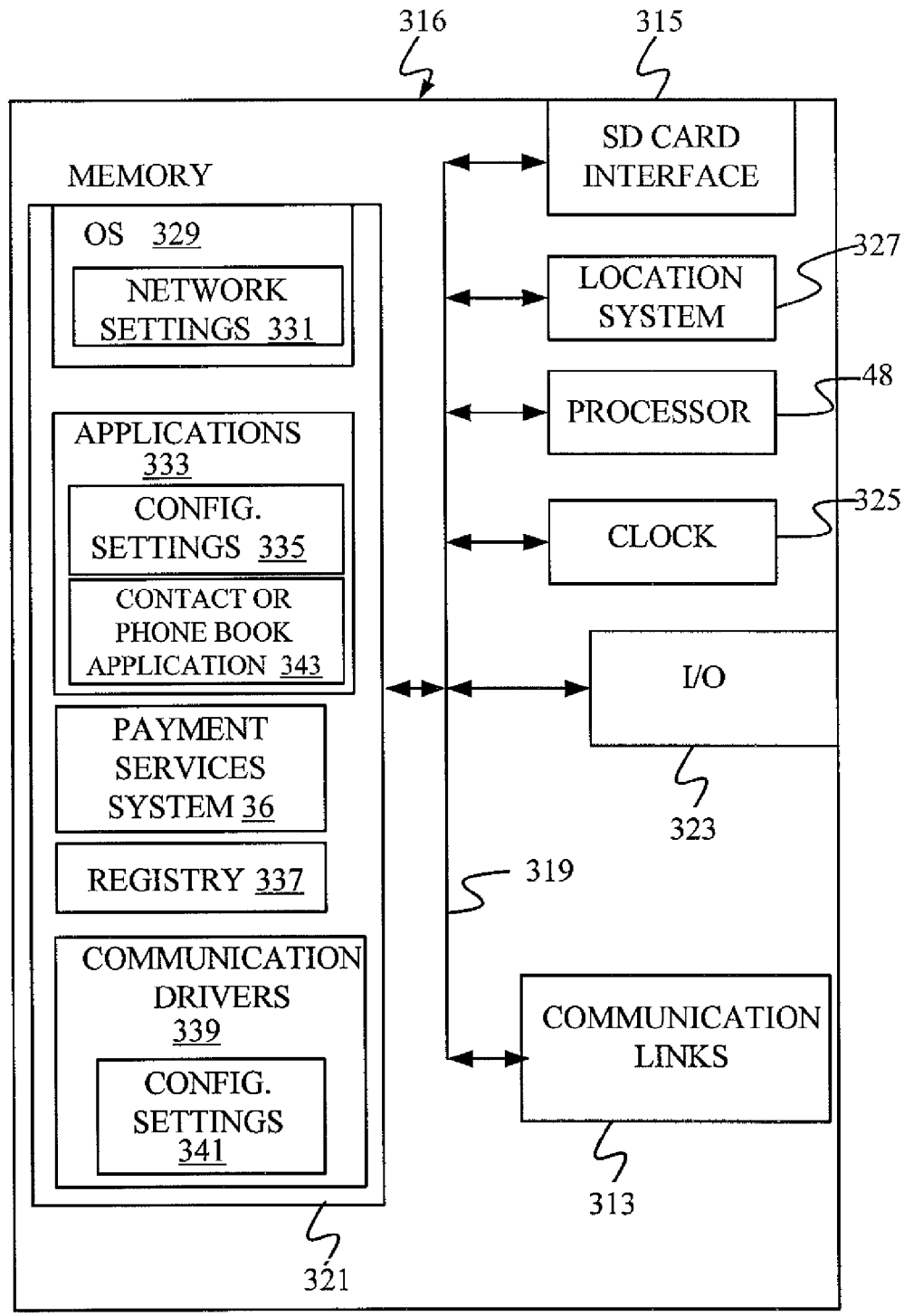
FIGS. 13-15 show illustrative embodiments of mobile devices.
Figure 14:
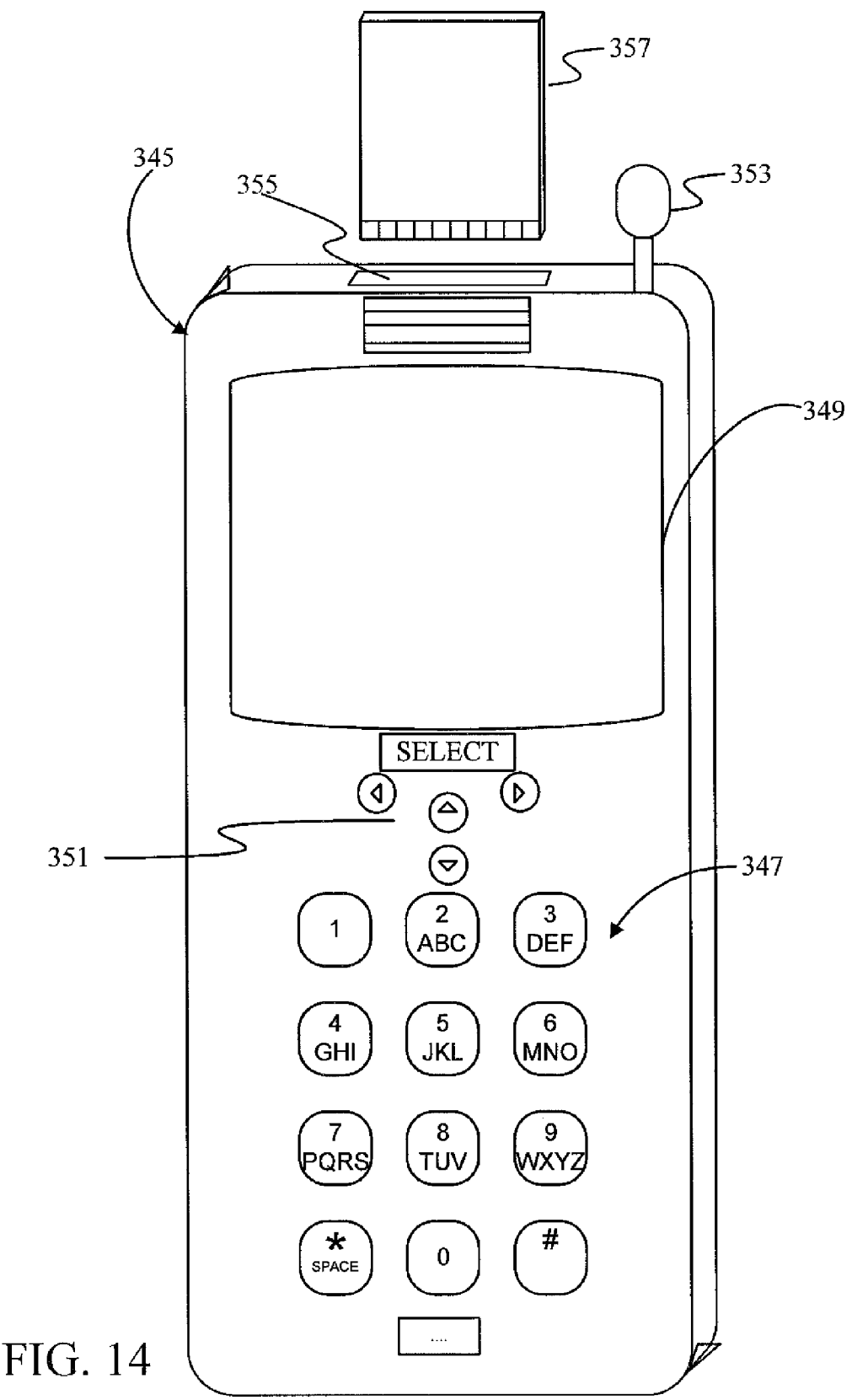
Figure 15:
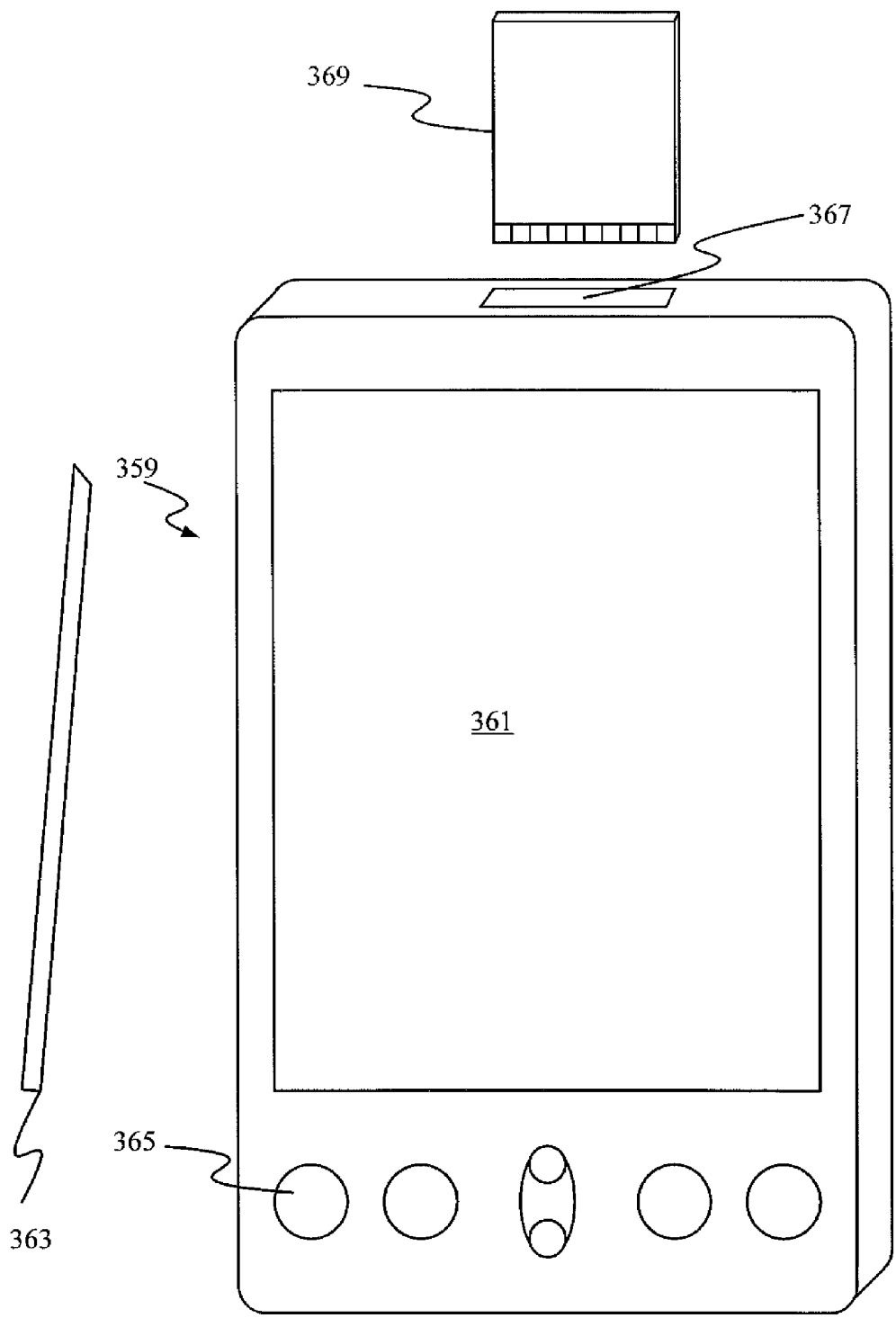

FIGS. 13-15 show a number of different embodiments for environments that can be used to implement all, or portions of, system 36. While these embodiments will be described in FIGS. 13-15, it should be noted that these are not exclusive, but are provided as illustrative and exemplary descriptions of embodiments.

It will also be noted that as mentioned above with respect to FIGS. 1 and 2, 36, or various components of system 36, can reside on one device or on a variety of different devices. In FIG. 13-15 system 36 is shown on one device, but this is exemplary only.

In any case, FIG. 13 is a simplified block diagram of one illustrative embodiment of a handheld or mobile computing device 316, in which the present system can be deployed. FIGS. 14 and 15 are examples of handheld or mobile devices.

FIG. 13 provides a general block diagram of the components of a client device 316 that can run components of system 36 or that interacts with system 36, or both. In the device 316, a communications link 313 is provided that allows the handheld device to communicate with other computing devices and under some embodiments provides a channel for receiving information automatically, such as by scanning. Examples of communications link 313 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 36) are received on a removable Secure Digital (SD) card that is connected to a SD card interface 315. SD card interface 315 and communication links 313 communicate with a processor 48 (which can also embody processor 48 from FIG. 2) along a bus 319 that is also connected to memory 321 and input/output (I/O) components 323, as well as clock 325 and location system 327.

I/O components 323, in one embodiment, are provided to facilitate input and output operations. I/O components 323 for various embodiments of the device 316 can include input components such as buttons, touch sensors, touch screens, proximity sensors, microphones, tilt sensors, and gravity switches and output components such as a display device, a speaker, and or a printer port. Other I/O components 323 can be used as well.

Clock 325 illustratively comprises a real time clock component that outputs a time and date. It can also, illustratively, provide timing functions for processor 48.

Location system 327 illustratively includes a component that outputs a current geographical location of device 316. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 321 stores operating system 329, network settings 331, applications 333, application configuration settings 335, registry 337, communication drivers 339, and communication configuration settings 341. Memory 321 can include all types of tangible volatile and non-volatile computer-readable memory devices. It can also include computer storage media (described below). Memory 321 stores computer readable instructions that, when executed by processor 48, cause the processor to perform computer-implemented steps or functions according to the instructions. System 36 or the items in data stores of FIG. 2, for example, can reside in memory 321. Processor 48 can be activated by other components to facilitate their functionality as well.

Examples of the network settings 331 include things such as proxy information, Internet connection information, and mappings. Application configuration settings 335 include settings that tailor the application for a specific enterprise or user. Communication configuration settings 341 provide parameters for communicating with other computers and include items such as GPRS parameters, SMS parameters, connection user names and passwords.

Applications 333 can be applications that have previously been stored on the device 316 or applications that are installed during use, although these can be part of operating system 329, or hosted external to device 316, as well.

FIGS. 14 and 15 provide examples of devices 316 that can be used, although others can be used as well. In FIG. 14, a smart phone or mobile phone 345 is provided as the device 316. Phone 345 includes a set of keypads 347 for dialing phone numbers, a display 349 capable of displaying images including application images, icons, web pages, photographs, and video, and control buttons 351 for selecting items shown on the display. The phone includes an antenna 353 for receiving cellular phone signals such as General Packet Radio Service (GPRS) and 1Xrtt, and Short Message Service (SMS) signals. In some embodiments, phone 345 also includes a Secure Digital (SD) card slot 355 that accepts a SD card 357. The mobile device of FIG. 15 is a personal digital assistant (PDA) 359 or a multimedia player or a tablet computing device, etc. (hereinafter referred to as PDA 359). PDA 359 includes an inductive screen 361 that senses the position of a stylus 363 (or other pointers, such as a user's finger) when the stylus is positioned over the screen. This allows the user to select, highlight, and move items on the screen as well as draw and write. PDA 359 also includes a number of user input keys or buttons (such as button 365) which allow the user to scroll through menu options or other display options which are displayed on display 361, and allow the user to change applications or select user input functions, without contacting display 361. Although not shown, PDA 359 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 359 also includes a SD card slot 367 that accepts a SD card 369. Note that other forms of the devices 316 are possible. Examples include tablet computing devices, music or video players, and other handheld computing devices.

Figure 16:
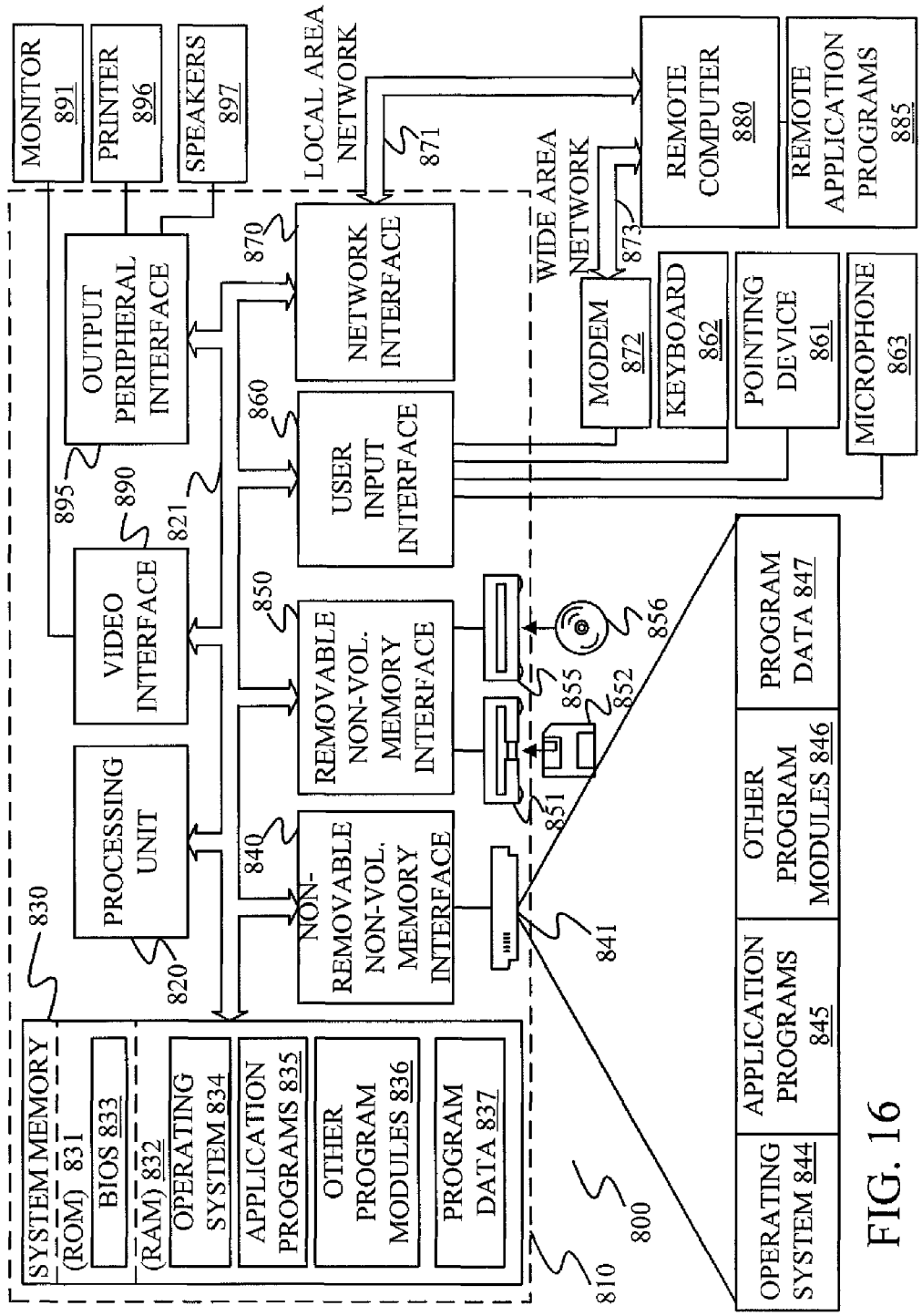
FIG. 16 shows one illustrative embodiment of a computing environment which can be used for portions of the system shown in FIG. 2.

FIG. 16 is one embodiment of a computing environment in which system 36 (for example) can be deployed. With reference to FIG. 16, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 16 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 16 illustrates remote application programs 885 as residing on remote computer 880. It will be appreciated that the network connections shown are exemplary and other means of establishing a communications link between the computers may be used.

It will also be noted that as shown in FIG. 1, system 36, or various components of system 36, can reside elsewhere, other than on the back office components or the POS or headquarters. For instance, it could be embodied in a cloud computing environment. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 36 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed in the portions shown in FIG. 1 directly, or in other ways.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A payment processing system, comprising:
   a plurality of chip card readers, each chip card reader corresponding to a respective point-of-sale (POS) location;
   a payment platform that is distinct from each of the respective POS locations corresponding to the plurality of chip card readers, and exposes a chip card payment processor interface through which the payment platform communicates with a given chip card payment processor, and exposes a device interface through which the payment platform communicates with each of the plurality of chip card readers;
   a configuration component, coupled to the payment platform, generating user interface displays with user input mechanisms that receive configuration inputs for configuring the plurality of chip card readers, wherein the configuration inputs identify a particular one of the chip card readers, specify a given device interface to be used at the particular chip card reader, and specify a given chip card payment processor interface to be used for processing electronic funds transfer payments taken at the particular chip card reader; and
   a computer processor, that is a functional part of the payment processing system, activated by the payment platform and the configuration component to facilitate communication with each chip card reader and with the given chip card payment processor, and to facilitate configuration of the payment platform.

2. The payment processing system of claim 1 wherein the payment platform comprises:
   a payment services component that receives payment request data from the given device interface according to a first communication format used by the particular chip card reader and transmits the payment request data to the given chip card payment processor through the chip card payment processor interface according to a second communication format used by the given chip card payment processor.

3. The payment processing system of claim 2 wherein the first communication format is different than the second communication format.

4. The payment processing system of claim 3 wherein the first communication format used by the particular chip card reader is implemented by the given device interface, and the second communication format used by the chip card payment processor is implemented by the chip card payment processor interface.

5. The payment processing system of claim 2 wherein the plurality of chip card readers are at multiple different POS locations each located remotely from the configuration component, and wherein the user input mechanisms generated by the configuration component receive configuration information that is applied to the plurality of chip card readers.

6. The payment processing system of claim 5 wherein the multiple POS locations comprises a plurality of different retail store locations.

7. The payment processing system of claim 2 wherein the payment platform comprises:
a chip card peripheral device interface component that receives pluggable device interfaces for a plurality of different types of card readers, each communicating with the payment platform according to a different communication format, and exposes a particular device interface to a particular chip card reader at a particular POS based on the configuration inputs.

8. The payment processing system of claim 2 wherein the payment platform comprises:
a chip card payment processor interface component that receives pluggable payment processor interfaces for a plurality of different chip card payment processors, each communicating with the payment platform according to a different communication format, and exposes a particular payment processor interface to a particular chip card payment processor based on the configuration inputs.

9. The payment processing system of claim 2 and further comprising:
a POS user component that generates user interface displays and user input mechanisms for conducting interactions with a user at a corresponding POS, the user interface displays receiving a tender type input indicative of the user selecting a chip card transaction.

10. The payment processing system of claim 9 wherein the payment services component includes an electronic funds transfer component, the POS user component transferring control of an electronic funds transfer payment to the electronic funds transfer component based on the tender type input.

11. The payment processing system of claim 10 wherein the electronic funds transfer component receives security keys from the given chip card payment processor through the given chip card payment processor interface and writes them to a chip card using the particular chip card reader, through the given device interface.

12. A computer-implemented method of performing a payment transaction comprising:
identifying a plurality of payment processor interfaces that are communicatively coupled to a payment processor interface component, the plurality of payment processor interfaces interfacing with a plurality of payment processors such that each of the payment processor interfaces conduct payment communications with a corresponding payment processor;
identifying a plurality of chip card reader device interfaces that are communicatively coupled to a peripheral device interface component, the plurality of chip card reader device interfaces interfacing with a plurality of chip card reader devices such that each of the chip card reader device interfaces conduct payment communications with a different one of the chip card reader devices, each chip card reader corresponding to a respective point-of-sale (POS) location; and
configuring, using a computer processor, a payment platform that includes the peripheral device interface component to facilitate payment transactions using each of the plurality of chip card reader devices, wherein configuring comprises:
generating a user interface display having user input mechanisms;
receiving, through the user input mechanisms, device configuration inputs that select one of the chip card reader devices and specify configuration parameters for the selected chip card reader device;
receiving, through the user input mechanisms, processor configuration inputs that select one of the payment processors for processing payments received at the selected chip card reader device; and
configuring the chip card reader device interface, corresponding to the selected chip card reader device, to conduct payment communications with the selected chip card reader device at a specified point of sale, and the payment processor interface, corresponding to the selected payment processor, to conduct payment communications with the selected payment processor based on card information received from the selected chip card reader device.

13. The computer-implemented method of claim 12 wherein the specified point of sale comprises one of the POS locations that is selected through the user input mechanisms, and further comprising:
populating the user interface display with a set of peripheral devices at the selected POS location, wherein the device configuration inputs select the chip card reader device from the set of peripheral devices.

14. The computer-implemented method of claim 12 wherein the peripheral device interface component of the payment platform exposes the plurality of chip card reader device interfaces, and wherein receiving device configuration inputs comprises:
receiving a user input specifying a desired chip card reader interface.

15. The computer-implemented method of claim 12 wherein, in the configured payment platform, the selected chip card reader device communicates according to a first communication format and the selected payment processor communicates according to a second communication format, different from the first communication format.

16. The computer-implemented method of claim 15 and further comprising:
conducting a payment transaction using the selected chip card reader device and the selected payment processor.

17. The computer-implemented method of claim 12 wherein:
for each of the plurality of chip card reader devices, the device configuration inputs specify configuration parameters for the chip card reader device and the processor configuration inputs select one of the payment processors for processing payments received at the chip card reader device.

18. The computer-implemented method of claim 17 and further comprising:
configuring the payment platform to expose the chip card reader interface, for each of the chip card reader devices, to conduct payment communications with the chip card reader device; and
configuring the payment platform to expose the payment processor interface, for each of the payment processors, to conduct payment communications with the payment processor based on card information received from the chip card reader device for which the payment processor is selected to process payments.

19. A payment processing system comprising:
a chip card payment processor interface component that communicates with payment processor interfaces for a plurality of different chip card payment processors, each of the chip card processors communicating with the chip card payment processor interface component through one of the payment processor interfaces;

a chip card device interface component that communicates with device interfaces for a plurality of different chip card readers, each of the chip card readers communicating with the chip card device interface component through one of the device interfaces according to a different communication format;

a payment services component communicatively coupled to the chip card payment processor interface component and the chip card device interface component, the payment services component configured to interact with the plurality of different chip card readers in conducting transactions, and to interact with the plurality of different chip card payment processors to authenticate and validate the transactions;

a configuration component that generates user interface displays with user input mechanisms that receive configuration inputs for configuring the payment services component to conduct payment transactions between the chip card readers and the chip card payment processors, the configuration inputs specifying, for each of the chip card reader devices, one or more of the chip card payment processors to be used for processing chip card payments taken at the chip card reader device; and one or more computer processors, being a functional part of the payment processing system, activated by the payment services component and configuration component to facilitate conducting the payment transactions between the chip card readers and the chip card payment processors.

20. The payment processing system of claim 19, wherein each of the chip card payment processors communicate with the chip card payment processor interface component according to a different communication format, and wherein the payment services component receives payment request data according to a first communication format used by a particular one of the chip card readers and transmits the payment request data to a particular one of the chip card payment processors according to a second communication format used by the particular chip card payment processor.

* * * * *